United States Patent
Eriksson et al.

(10) Patent No.: US 12,279,118 B2
(45) Date of Patent: Apr. 15, 2025

(54) METHOD AND SYSTEM FOR EXPOSING RADIO ACCESS NETWORK (RAN) DATA

(71) Applicant: Telefonaktiebolaget LM Ericsson (publ), Stockholm (SE)

(72) Inventors: Ann-Christine Eriksson, Enköping (SE); Massimo Condoluci, Sundbyberg (SE); Tomas Nylander, Värmdö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 167 days.

(21) Appl. No.: 18/038,284

(22) PCT Filed: Nov. 24, 2020

(86) PCT No.: PCT/SE2020/051114
§ 371 (c)(1),
(2) Date: May 23, 2023

(87) PCT Pub. No.: WO2022/115010
PCT Pub. Date: Jun. 2, 2022

(65) Prior Publication Data
US 2024/0098495 A1    Mar. 21, 2024

(51) Int. Cl.
*H04W 12/086* (2021.01)
*H04W 4/60* (2018.01)

(52) U.S. Cl.
CPC .......... *H04W 12/086* (2021.01); *H04W 4/60* (2018.02)

(58) Field of Classification Search
CPC .............................. H04W 12/086; H04W 4/60
See application file for complete search history.

(56) References Cited

U.S. PATENT DOCUMENTS

| | | | |
|---|---|---|---|
| 12,034,299 B1* | 7/2024 | Caruso | H02J 13/00016 |
| 2018/0192471 A1* | 7/2018 | Li | H04W 4/60 |

(Continued)

FOREIGN PATENT DOCUMENTS

| | | |
|---|---|---|
| WO | 2020098951 A1 | 5/2020 |
| WO | 2020147927 A1 | 7/2020 |

(Continued)

OTHER PUBLICATIONS

Author Unknown, "Technical Specification Group Services and System Aspects; Study on architecture enhancement for the Evolved Packet System (EPS) and the 5G System (5GS) to support advanced V2X services (Release 16)," Technical Report 23.786, Version 16.1.0, Jun. 2019, 3GPP Organizational Partners, 119 pages.

(Continued)

*Primary Examiner* — Jonathan A Bui
(74) *Attorney, Agent, or Firm* — Withrow & Terranova, PLLC

(57) ABSTRACT

A method performed by a Radio Area Network, RAN, function node for handling connectivity in a RAN is provided. The RAN function node receives from a network node, a first subscription request for one or more RAN insights relating to the connectivity, requested for an application related to a wireless device. The RAN function node identifies RAN data needed to fulfil the subscription request and sends to a RAN node, a second subscription request for the identified RAN data. The RAN function node receives published RAN data according to the second subscription request and generates the RAN insights according to the first subscription request based on the received RAN data. The RAN function node establishes which domain out of a trusted domain or an untrusted domain the generated RAN insights are to be exposed in and publishes the generated RAN insights according to the first subscription request.

15 Claims, 13 Drawing Sheets

(56) References Cited

U.S. PATENT DOCUMENTS

| | | | | |
|---|---|---|---|---|
| 2018/0262924 A1* | 9/2018 | Dao | ................... | H04W 72/535 |
| 2018/0288590 A1* | 10/2018 | Bhalla | ..................... | H04L 67/51 |
| 2019/0173907 A1* | 6/2019 | Kras | .................. | H04L 63/1433 |
| 2019/0182645 A1* | 6/2019 | Joseph | ..................... | H04W 4/60 |
| 2020/0045559 A1 | 2/2020 | Kim et al. | | |

FOREIGN PATENT DOCUMENTS

| | | |
|---|---|---|
| WO | 2020156663 A1 | 8/2020 |
| WO | 2020171803 A1 | 8/2020 |
| WO | 2020183254 A1 | 9/2020 |

OTHER PUBLICATIONS

Huawei, et al., "S2-1903754: KI#15: Update of Solution 29," 3GPP TSG-SA WG2 Meeting #132, Apr. 8-12, 2019, Ki'an, China, 4 pages.

Huawei, et al., "S2-183941: Use Case: NWDA-assisting E2E QoS Assurance," 3GPP SA WG2 Meeting #127, Apr. 16-20, 2018, Sanya, China, 4 pages.

LG Electronics, et al., "S2-1900492: TS 23.288 Analytics Exposure to AFs," 3GPP TSG-SA WG2 Meeting #130, Jan. 21-25, 2019, Kochi, India, 3 pages.

International Search Report and Written Opinion for International Patent Application No. PCT/SE2020/051114, mailed Aug. 26, 2021, 15 pages.

Extended European Search Report for European Patent Application No. 20963787.5, mailed Jul. 16, 2024, 8 pages.

\* cited by examiner

201. Receive from a network node, a first subscription request for one or more RAN insights relating to the connectivity requested for an application related to a wireless device.

202. Identify RAN data needed to fulfil the subscription request for the one or more RAN insights.

203. Send to a RAN node, a second subscription request for the identified RAN data.

204. Receive from the RAN node, published RAN data according to the second subscription request.

205. Generate the one or more RAN insights according to the first subscription request based on the received RAN data.

206. Establish which domain out of a trusted domain or an untrusted domain the generated one or more RAN insights are to be exposed in.

207. Publish the generated one or more RAN insights according to the first subscription request to reach the network node, wherein the publishing comprises an indication, indicating to the network node the established domain out of a trusted domain or an untrusted domain, that the generated one or more RAN insights are to be exposed in.

Fig. 2

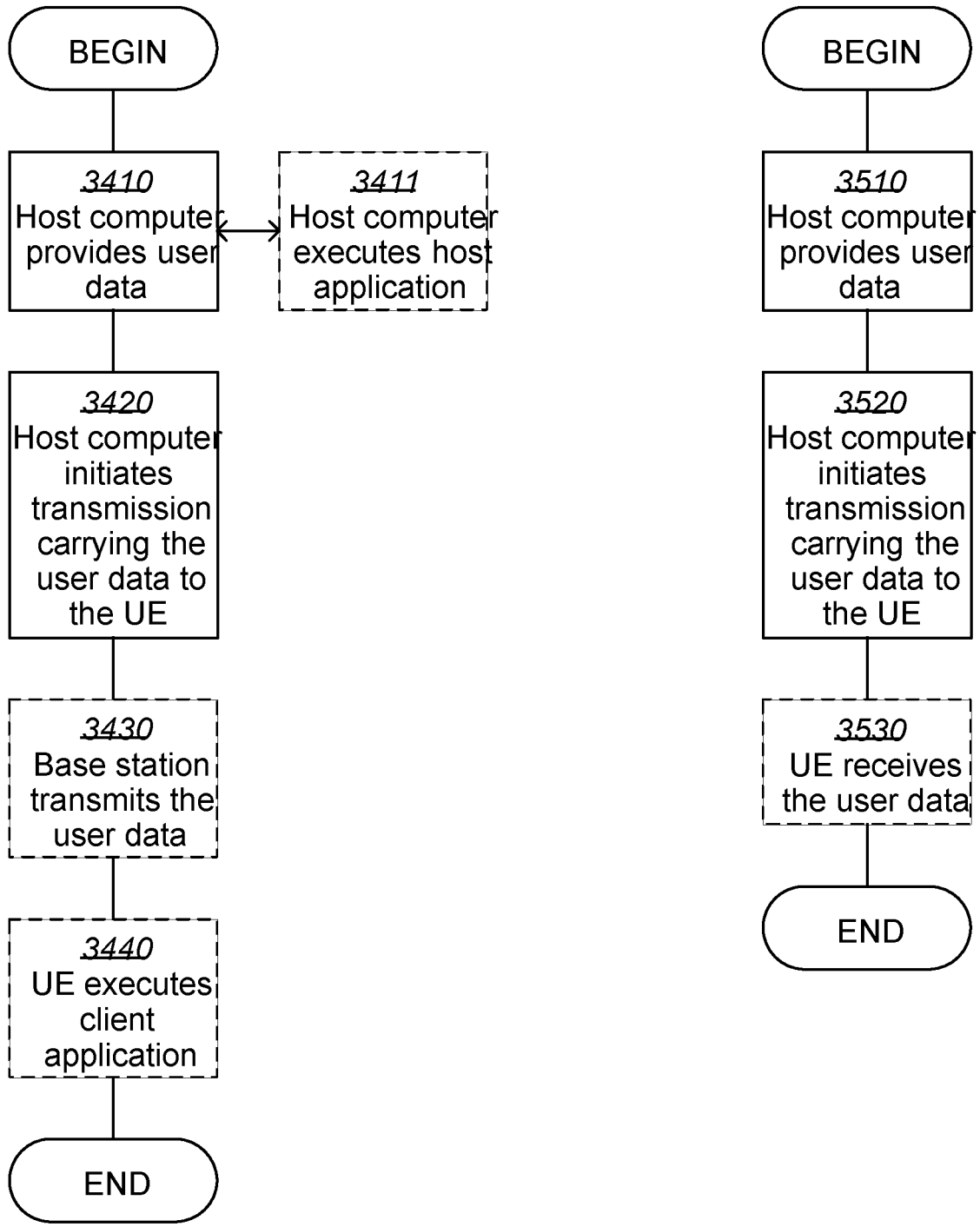

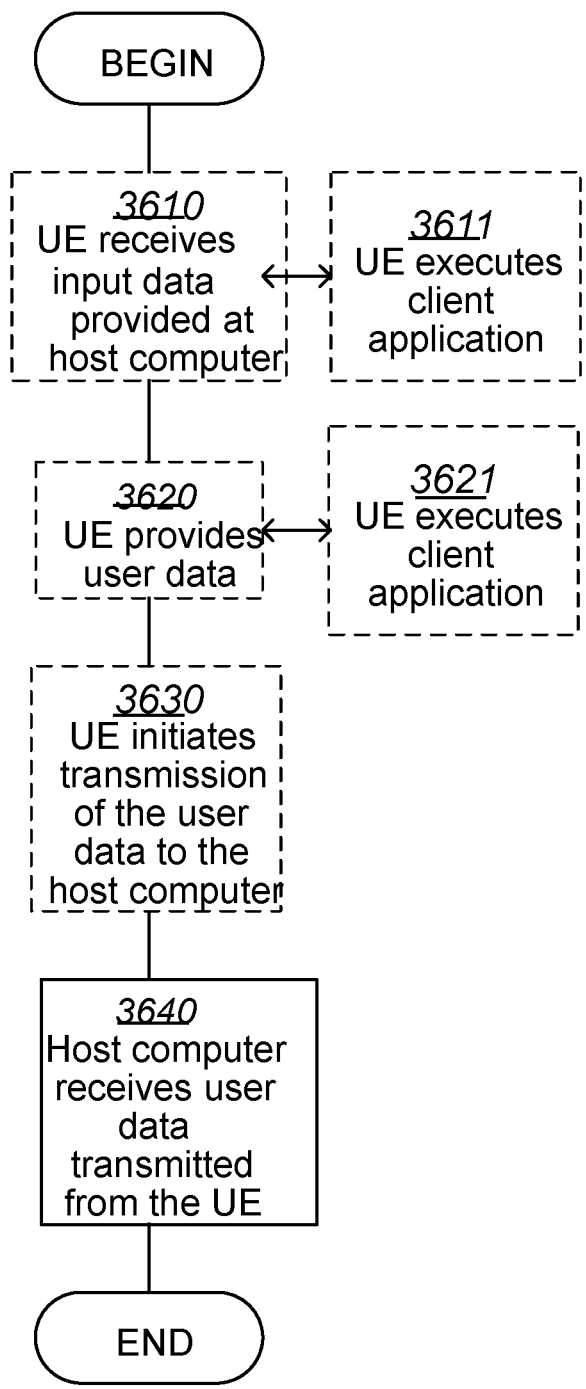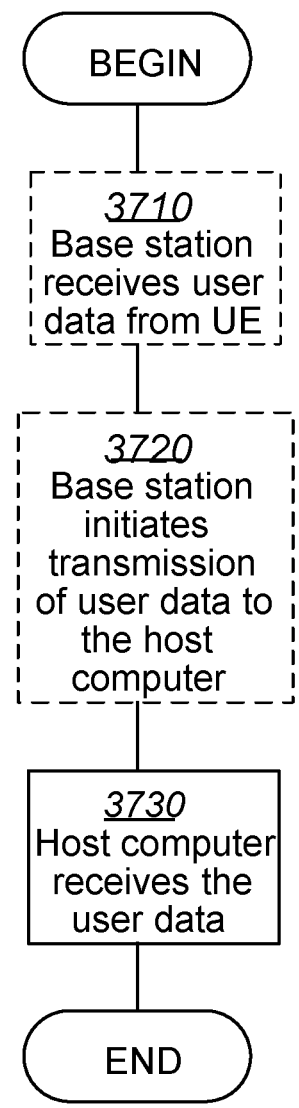
FIG 14
FIG 15

METHOD AND SYSTEM FOR EXPOSING RADIO ACCESS NETWORK (RAN) DATA

This application is a 35 U.S.C. § 371 national phase filing of International Application No. PCT/SE2020/051114, filed Nov. 24, 2020, the disclosure of which is incorporated herein by reference in its entirety.

TECHNICAL FIELD

Embodiments herein relate to a Radio Access Network (RAN) function node, a network node and methods therein. In some aspects they relate to handling connectivity in a RAN of a wireless communications network.

Embodiments herein further relates to computer programs and carriers corresponding to the above methods, RAN function node and network node.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

A major difference with 5G Core (5GC) compared to EPC is that 5GC's control plane (CP) functions interact in a Service-Based Architecture (SBA). A key Network Function (NF) of SBA is the Network Repository Function (NRF), which provides NF service registration and discovery, enabling NFs to identify appropriate services in one another. SBA principles apply to interfaces between CP functions within 5GC only, so interfaces toward Radio Access Network (RAN), user equipment or user plane (UP) functions are excluded.

Other changes include several new functions, such as the Network Exposure Function (NEF).

RAN Data

RAN data when used herein relates to connectivity in a RAN, e.g. connectivity over a radio interface between a RAN node and a radio device in the RAN. Thus, examples of RAN data may comprise measurement collected by RAN standardized from 3GPP such as e.g. average and/or distribution of delay on the radio interface, DL and/or UL total and/or distribution of Physical Resource Blocks (PRB) usage, average and/or distribution of DL and/or UL UE throughput, and/or proprietary measurements and/or counters implemented by RAN vendor such as e.g., specific measurements of specific parameters at e.g. Radio Link Control (RLC) or Medium Access Control (MAC) layer not defined by 3GPP.

RAN data is important, this is since they capture in detail RAN behavior, and obviously RAN behavior impacts performance experienced by UEs served by the RAN. From one side, it is observed a raise of more complex applications, which could benefit by leveraging on features such as network exposure from information of expected performance experienced over a mobile network. On another side, the SBA architecture of 5G opens for possibility to create new services leveraging on information exposed by another functions or nodes of the network. Consequently, RAN data represents a key factor, especially if properly processed, to support new services within a mobile network.

RAN data may be used to generate information or notifications of importance for many applications, such as applications running in radio devices such as e.g. Internet of Things (IoT) devices, radio devices in vehicles or smartphones, such as UEs.

SUMMARY

As a part of developing embodiments herein a problem was identified by the inventors and will first be discussed.

RAN nodes have an ability to stream out data in near real-time. This may be to feed a management system to support off-line analysis of RAN performance, e.g. RAN observability. However direct exposure of RAN data to other than the management system may not be desired for several reasons, since what can be obtained from RAN is raw data. Raw RAN data, referred to as RAN data, when used herein means RAN data such as e.g. standardized measurements, proprietary measurements, etc., in the form as they are collected by the RAN.

The RAN data being raw data:
(i) needs to be analyzed and abstracted to be useful for usage at applications, e.g., an application might not benefit from knowing that PRB utilization is 50%, but it might benefit from knowing that no congestion is expected, and
(ii) needs to be processed to avoid that sensitive information about RAN behavior and/or configurations would be exposed.

Furthermore, the RAN data may need to be normalized to provide same information from different RAN vendors. To be normalized e.g. means that instead of providing an explicit value as for example "average DL throughput: 10 Mbps", there may be a pre-defined normalization which translate the information as "DL throughput: good".

Another reason for direct exposure of RAN data not being desired, is that that the RAN data should not be exposed to non-authorized parties. This is to prevent misuse and potential privacy issues and, in general, the content of the RAN data could be different considering whether the final receiver could be either trusted or untrusted. Trusted when used herein means that the network operator trusts that the final receiver will not misuse the information received from the network, e.g. defined via some specific agreements, or the operator trusts that information provided to the receiver will not leave network trusted domain, e.g., the receiver is an application hosted in the network domain. A trusted receiver might be allowed to obtain more sensitive information than an untrusted receiver. E.g., a trusted receiver may obtain the information "average predicted DL throughput: 10 Mbps" while an untrusted might obtain the information "average predicted DL throughput: good". Generally, RAN data should be generated with knowledge whether they are going to be exposed to trusted/untrusted receivers.

Currently, there is no standardized way for RAN to expose RAN data to external applications. External applications when used herein may comprise Application Function (AF) or an application server interested to receive information about expected network performance of UE(s) associated to the application.

An object of embodiments herein is to provide an improved way of securely exposing RAN data.

According to an aspect, the object is achieved by a method performed by a RAN, function node for handling connectivity in a RAN of a wireless communications network. The RAN function node receives a first subscription request from a network node. The first subscription request is for one or more RAN insights relating to the connectivity, requested for an application related to a wireless device. The RAN function node identifies RAN data needed to fulfil the subscription request for the one or more RAN insights. The RAN function node sends a second subscription request to a RAN node. The second subscription request is for the identified RAN data. When RAN data according to the second subscription request is available, the RAN function node receives from the RAN node, published RAN data according to the second subscription request. The RAN function node generates the one or more RAN insights according to the first subscription request based on the received RAN data. The RAN function node establishes which domain out of a trusted domain, or an untrusted domain the generated one or more RAN insights are to be exposed in. The RAN function node then publishes the generated one or more RAN insights according to the first subscription request to reach the network node. The publishing comprises an indication, indicating to the network node the established domain out of a trusted domain or an untrusted domain, that the generated one or more RAN insights are to be exposed in.

According to another aspect, the object is achieved by a method performed by a network node for handling connectivity in a RAN of a wireless communications network. The network node sends a first subscription request to a RAN function node. The first subscription request is for one or more RAN insights relating to the connectivity, requested for an application related to a wireless device. The network node discovers the one or more RAN insights when one or more RAN insights according to the first subscription is generated and published by the RAN function node. The published one or more RAN insights comprises an indication, indicating a domain out of a trusted domain or an untrusted domain, that the generated one or more RAN insights are to be exposed in. The network node then exposes the published one or more RAN insights in the indicated domain.

According to an aspect, the object is achieved by a RAN function node configured to handle connectivity in a RAN of a wireless communications network. The RAN function node is further configured to: Receive from a network node a first subscription request for one or more RAN insights relating to the connectivity, requested for an application related to a wireless device, identify RAN data needed to fulfil the subscription request for the one or more RAN insights, send to a RAN node, a second subscription request for the identified RAN data, when RAN data according to the second subscription request is available, receive from the RAN node, published RAN data according to the second subscription request, generate the one or more RAN insights according to the first subscription request based on the received RAN data, establish which domain out of a trusted domain or an untrusted domain the generated one or more RAN insights are to be exposed in, and publish the generated one or more RAN insights according to the first subscription request to reach the network node, wherein the publishing is adapted to comprise an indication indicating to the network node, the established domain out of a trusted domain or an untrusted domain, that the generated one or more RAN insights are to be exposed in.

According to another aspect, the object is achieved by a network node configured to handle connectivity in a RAN of a wireless communications network. The network node is further configured to: Send to a RAN function node a first subscription request for one or more RAN insights relating to the connectivity, requested for an application related to a wireless device, when one or more RAN insights according to the first subscription is generated and published by the RAN function node, discover the one or more RAN insights, wherein the published one or more RAN insights are arranged to comprise an indication adapted to indicate a domain out of a trusted domain or an untrusted domain, that the generated one or more RAN insights are to be exposed in, and expose the published one or more RAN insights in the indicated domain.

The publishing of the one or more RANs comprises an indication of which one of a trusted or an untrusted domain, that the generated one or more RAN insights are to be exposed in, by the network node. When the network node exposes the one or more RANs according to the indication, the risk for exposure of sensitive RAN insights is avoided since sensitive RAN insights will be exposed in a trusted domain.

This in turn provides an improved way of exposing RAN data that is processed to be RAN insights to suit a receiver of the RAN insights.

BRIEF DESCRIPTION OF THE DRAWINGS

FIG. 2 is a flowchart depicting embodiments of a method in a RAN function node.

FIGS. 12 to 15 are flowcharts illustrating methods implemented in a communication system including a host computer, a base station and a user equipment.

DETAILED DESCRIPTION

An example of embodiments herein relates to RAN exposure handling.

Embodiments herein are e.g. related to connectivity, and service continuity in a RAN.

Embodiments herein provide methods for exposure of processed RAN information, referred to as RAN insights, that are useful and, potentially, tailored for specific applications without risk for exposure of sensitive raw RAN data, referred to as RAN data.

Figure 1:
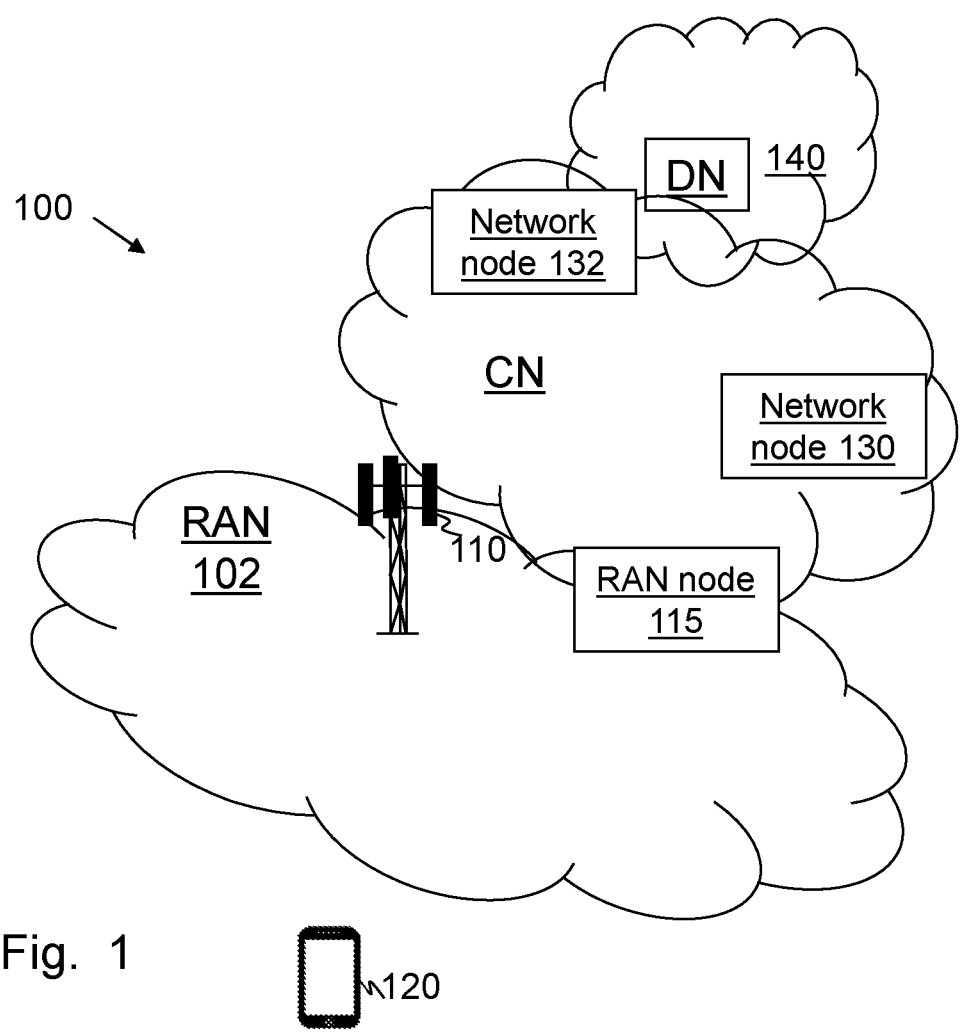
FIG. 1 is a schematic block diagram illustrating embodiments of a wireless communication network.

FIG. 1 is a schematic overview depicting a wireless communications network 100 wherein embodiments herein may be implemented. The wireless communications network 100 comprises one or more RANs, such as the RAN 102 and one or more CNs. The wireless communications network 100 may use 5 Fifth Generation New Radio, (5G NR) but may further use a number of other different Radio Access Technologies (RAT)s, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes, such as a RAN node 110, or also called distributed node, operate 35 in the RAN 102. The distributed node 110 may provide radio access in one or more cells in the RAN 102. This may mean that the RAN node 110 provides radio coverage over a geographical area by means of its antenna beams. The RAN node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a radio device within the cell served by RAN node 110 depending e.g. on the radio access technology and terminology used.

According to embodiments herein, a RAN function node 115 operates in the wireless communications network 100, e.g. in a RAN domain of the RAN 102 or in a management domain, e.g. of the CN. In some embodiments the RAN function node 115 operates in the RAN 102 or in the CN. The RAN function node 115 is adapted to gather RAN data, e.g. from the RAN node 110 using E-UTRAN and/or NG-RAN, and process such RAN data to generate RAN insights, e.g. analyzed, abstracted, processed and/or normalized RAN data. The RAN function node 115 may also be referred to as a RAN Prediction Function (PF). The RAN function node 115 uses RAN data to predict metrics related to performance that a UE such as e.g. a wireless device 120, is expected to experience, e.g. based on historical data, estimation, and/or predictions, in an upcoming time window. Such metrics may be related to throughput, e.g., potential throughput changes, congestion, and/or related latency etc.

Throughput e.g. comprises upcoming throughput degradation or upcoming throughput improvement. Congestion e.g. comprises upcoming congestion or upcoming end of congestion. Related latency e.g. comprises upcoming latency increase.

As hinted above, the RAN data may e.g. be used to generate predictions of interruptions in connectivity, predictions of potential throughput changes, or predictions of potential congestion, or predictions of potential latency changes in the RAN. Predictions of potential throughput changes may e.g. comprise upcoming throughput degradation in the RAN. Predictions of potential congestion may e.g. comprise upcoming congestion and/or upcoming end of congestion. Predictions of potential latency changes may e.g. comprise upcoming latency increase in the RAN.

Such RAN insights, also referred to as RAN information may be used to inform applications in radio devices, such as e.g. the wireless device 120 about an upcoming change of achievable performance in the RAN and the application in the radio device may then adjust its behavior and configuration in order to mitigate bad experience in the application. E.g., a vehicle may adjust its behavior in terms of reducing speed or changing automation level to overcome the fact that the current vehicle behavior may not be suitable considering the upcoming interruption or a drop in throughput or a congestion or a latency increase of the RAN.

Further, a network node 130 operates in the wireless communications network 100. The network node 130 may e.g. be a core network node operating in the CN. The network node 130 may e.g. referred to as a network entity.

RAN insights are generated by the RAN function node 115 e.g. upon request from network node 130.

Another network node 132 may in some embodiments operate in the wireless communications network 100.

The network node 130 may e.g. be a Network Data Analytics Function (NWDAF) node, a Network Exposure Function (NEF) node, or and Application Programming Interfaces-Gateway (API-GW) node.

A NWDAF is e.g. responsible for providing network analysis information upon request from network functions.

A NEF is e.g. related to the 3GPP 5G Architecture. This function provides a means to securely expose the services and capabilities provided by 3GPP network functions.

An API-GW is e.g. responsible for providing APIs to external applications. An API-GW may allow external applications to use APIs of e.g. a NEF or of e.g. a NWDAF, although an external application might interact with NEF directly. An API-GW may be composed of several functionalities, e.g., including NEF functionalities, handling authorization of external applications, exchange of security keys, etc.

Wireless devices such as a wireless device 120 operate in the wireless communications network 100. The wireless device 120 may e.g. be an NR device, a mobile station, a wireless terminal, an NB-IoT device, an eMTC device, a CAT-M device, a WiFi device, an LTE device and an a non-access point (non-AP) STA, a STA, that communicates via such as e.g. the RAN node 110, one or more RANs such as the RAN 102 to one or more CNs. It should be understood by the skilled in the art that the wireless device 120 relates to a non-limiting term which means any wireless device, UE, terminal, vehicle radio device, wireless communication terminal, user equipment, (D2D) terminal, or node e.g. smart phone, laptop, mobile phone, sensor, relay, mobile tablets or even a small base station communicating within a cell.

Methods herein may e.g. be performed by the RAN function node 115, the network node 130. As an alternative, a Distributed Node (DN) and functionality, e.g. comprised in a cloud 140 as shown in FIG. 1, may be used for performing or partly performing the methods.

Examples of embodiments herein provide methods for exposing processed RAN information, referred to as RAN insights, that are useful and, potentially, tailored for specific applications without risk for exposure of sensitive raw RAN data, referred to herein as RAN data.

The wording RAN insights when used herein e.g. means information generated by the RAN function node 115 from processing of RAN data. The RAN insights are relevant to expected or events that a certain UE or group of UEs is expected to experience in an upcoming time window. Expected may comprise estimated and/or predicted, and performance may comprise throughput, congestion, latency, etc. Events may comprise loss of connectivity, handover, UP unavailability, etc.

Examples of RAN insights and what they may be used for will be described more in detail below.

The wording RAN data when used herein e.g. means measurements collected by a RAN node such as the RAN node 110, either standardized or proprietary. Collection of measurements may be performed with a certain frequency and measurements may be aggregated over a certain time window. Examples of RAN data may e.g. comprise:

Average and/or distribution of delay radio interface,
DL and/or UL total and/or distribution of PRB usage,
average and/or distribution of DL and/or UL UE throughput,
proprietary counters associated to specific parameters at e.g. RLC or MAC layer of a RAN node.

Such RAN data may be e.g. collected with different granularities, e.g., per UE, or per group of UEs, or per Quality class (QCI, 5QI), or per radio bearer, etc.

Examples of what RAN data may be used for processing one or more RAN data to generate a RAN insight e.g. comprising:

Processing DL total PRB usage of a RAN node to generate a prediction of upcoming RAN node load,
processing DL total PRB usage of a RAN node jointly with average DL throughput of a certain UE to generate a prediction of expected UE DL throughput considering upcoming PRB availability,
processing DL total PRB usage of a RAN node jointly with average DL delay of radio interface to generate a prediction of expected latency over radio interface considering upcoming PRB availability, etc.

The wordings exposing and to expose, when used herein e.g. means that RAN insights generated from the RAN function node 115 are provided to one or more network functions and/or network nodes to be directly consumed and/or to be further processed to be provided to external receivers such as an AF or an application client/server.

The wording trusted domain when used herein e.g. means that information in a trusted domain may not require normalization and/or translation to hide sensitive data.

The wording untrusted domain when used herein e.g. means that information in an untrusted domain may require normalization and/or translation to hide sensitive data.

According to embodiments herein, the network node 130 may be tailored depending on the final receivers of the RAN insights being in trusted or untrusted domains. Being tailored when used herein means that a RAN insight generated for a trusted domain may be a fine-granular and precise information e.g. indicating a specific value for an expected performance metric while a RAN insight generated for a untrusted domain may be a quantized or normalized information of an expected performance metric without containing a specific value.

E.g., the network node 130 may be tailored depending on the final receivers of the RAN insights being in trusted or untrusted domains.

These RAN insights may e.g. be finally published by the RAN function node 115 to a network message bus, thus other network nodes such as the network node 130 may consume these RAN insights, e.g., for their internal usage or for exposure to external applications.

Example of embodiments herein enhances the RAN 102 by introducing a functionality such as the RAN function node 115 for creation, upon request, of one or more RAN insights generated from RAN data provided by the RAN node 115. This allows the RAN function node 115 to generate useful RAN insights to be used e.g. by external applications and at the same time avoiding that RAN raw data, referred to herein as RAN data, are directly exposed. In some embodiments herein it may be considered that exposure of RAN insights should use a message bus for the exposure of RAN insights. In this way, the message bus could be used by the network node 130 in charge of exposing network information to applications, which subscribes to the relevant RAN insights. This, as well as by the RAN function node 115 itself to gather relevant RAN data to be used to generate the requested RAN insights. The RAN function node 115 may subscribe to and obtain from the RAN node 111 in the message bus, the RAN data in one authorization and/or security domain, i.e. in a trusted domain or an untrusted domain, the RAN function node 115 may be sent to the message bus to publish the processed "RAN insights" in another authorization/security domain.

Embodiments herein provide mechanisms to collect RAN data to process into RAN insights and distribute RAN insights to authorized consumers. Embodiments herein e.g. comprises the following advantages:

Avoids direct exposure of sensitive RAN data and instead allows the network node 130 to expose processed RAN data, i.e. RAN insights that is useful and, potentially, tailored for specific applications.
Re-use of existing mechanisms for network information exposure, i.e., there is no burden for the network node 130 to implement authorization, security, etc., mechanisms for exposure to external applications.
The final receiver of RAN insights may be either trusted or untrusted.

The provided embodiments may be applicable for 3GPP and Open RAN (ORAN), i.e. the RAN function node 115 may be realized as internal RAN software (SW) or as external RAN SW in e.g. in an edge cloud, or in ORAN Non Real-Time RAN Intelligent Controller (Non-RT RIC), or in ORAN Real-Time RAN Intelligent Controller (RT RIC).

FIG. 2 shows example embodiments of a method performed by the RAN function node 115, also referred to as a RAN PF, for handling connectivity in the RAN 102 of the wireless communications network 100. In some embodiments, the network node 130 is a trusted network node. In some embodiments, the RAN function node 115, the network node 130, and the RAN node 110 are operating in the same trusted domain.

The method comprises one or more of the following actions, which actions may be taken in any suitable order. The method will be defined and exemplified more in detail below. Actions that are optional are marked with dashed boxes in the figure.

Action 201

The RAN function node 115 receives a first subscription request from the network node 130. The first subscription request is for one or more RAN insights relating to the connectivity, such as e.g. throughput prediction, requested for an application related to the wireless device 120.

In some embodiments, the first subscription request for one or more RAN insights relating to the connectivity is received 201 from any one out of:
- A trusted network node 130, 132, e.g. a core network node such as e.g. NWDAF, NEF, API-GW,
- the application related to the wireless device 120 via the trusted network node 130, 132, or
- an external application via the trusted network node 130, 132.

Action 202

The RAN function node 115 identifies RAN data needed to fulfil the subscription request for the one or more RAN insights.

Action 203

The RAN function node 115 sends a second subscription request to the RAN node 110. The second subscription request is for the identified RAN data.

Action 204

When RAN data according to the second subscription request is available, the RAN function node 115 receives 204 from the RAN node 110, published RAN data according to the second subscription request.

Action 205

The RAN function node 115 generates the one or more RAN insights according to the first subscription request based on the received RAN data.

Action 206

The RAN function node 115 establishes which domain out of a trusted domain or an untrusted domain the generated one or more RAN insights are to be exposed in.

In some embodiments, this establishing comprises establishing that any one out of:
- the generated one or more RAN insights are to be exposed in a trusted domain when the RAN insights are to be used in a trusted network node 130, 132,
- the generated one or more RAN insights are to be exposed in a trusted domain when the application related to the wireless device 120 is established to be trusted, and
- the generated one or more RAN insights are to be exposed in an untrusted domain when the application related to the wireless device 120 is established to be untrusted.

In some embodiments, the establishing which domain out of a trusted domain or an untrusted domain the generated one or more RAN insights shall be exposed in, is based on whether the application is trusted or untrusted.

Action 207

The RAN function node 115 publishes the generated one or more RAN insights according to the first subscription request to reach the network node 130, wherein the publishing comprises an indication, indicating to the network node 130 the established domain out of a trusted domain or an untrusted domain, that the generated one or more RAN insights are to be exposed in. The nodes that the generated one or more RAN insights are to be exposed in may be nodes that will use the one or more RAN insights, they may be referred to as consumers, e.g. consumers of the generated one or more RAN insights. This node may the one requesting the one or more insights. This node may e.g. be any one out of: The network node 130, a trusted network node 130, 132, e.g. a core network node such as e.g. NWDAF, NEF, API-GW, the application related to the wireless device 120 via the trusted network node 130, 132, or an external application via the trusted network node 130, 132.

The indication may be explicit or implicit and indicate the trusted or untrusted domain in several different ways.

In some embodiments, the indication comprises any one out of:
- metadata indicating whether the one or more RAN insights are for a trusted application and are to be exposed in a trusted domain, or are for an untrusted application and are to be exposed in an untrusted domain, and
- RAN insights that are to be exposed in a trusted domain are published in an associated first message bus, and RAN insights that are to be exposed in an untrusted domain are published in an associated second message bus,
- an indication to expose the one or more RAN insights in a trusted network node 130, 132, e.g. a core network node such as e.g. NWDAF, NEF, API-GW,
- an indication to expose the one or more RAN insights in an untrusted network node 130, 132,
- an indication to expose in a trusted domain, the one or more RAN insights in the application related to the wireless device 120,
- an indication to expose in an untrusted domain, the one or more RAN insights in the application related to the wireless device 120,
- an indication to expose in a trusted domain, the one or more RAN insights in an external application,
- an indication to expose in an untrusted domain, the one or more RAN insights in an external application.

Figure 3:
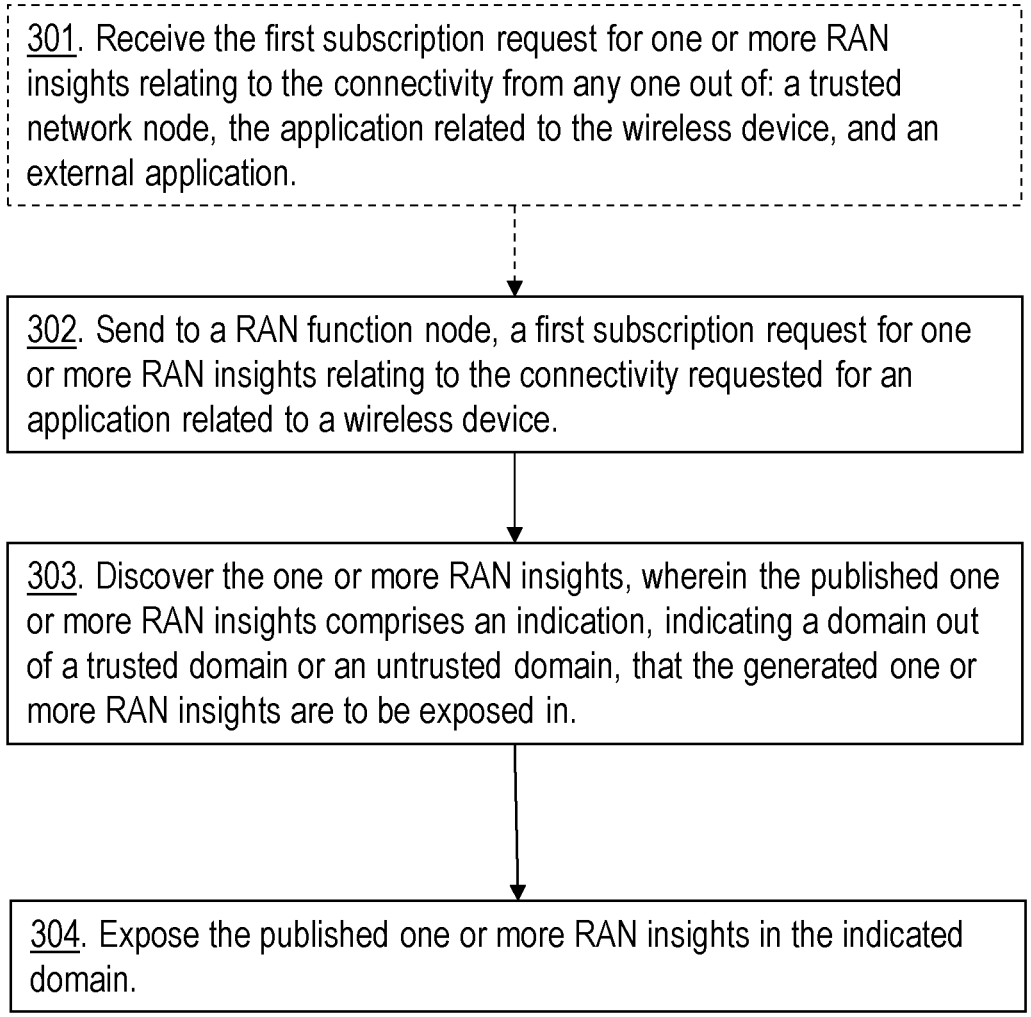
FIG. 3 is a flowchart depicting embodiments of a method in a network node.

FIG. 3 shows example embodiments of a method performed by the network node 130, for handling connectivity in a RAN 102 of a wireless communications network 100.

In some embodiments, the RAN function node 115, the network node 130 are operating in the same trusted domain.

The method comprises one or more of the following actions, which actions may be taken in any suitable order. Actions that are optional are marked with dashed boxes in the figure.

Action 301

In some embodiments, the network node 130 receives a first subscription request for one or more RAN insights relating to the connectivity from any one out of:
- a trusted network node 132, e.g. a core network node such as e.g. NWDAF, NEF, API-GW,
- the application related to the wireless device 120, an external application.

Action 302

The network node 130 sends a first subscription request to the RAN function node 115, also referred to as RAN PF. The first subscription request is for one or more RAN insights relating to the connectivity, e.g. throughput prediction, requested for an application related to the wireless device 120.

Action 303

When one or more RAN insights according to the first subscription is generated and published by the RAN function node 115, the network node 130 discovers the one or more RAN insights. The published one or more RAN insights comprises an indication. The indication indicates a domain out of a trusted domain or an untrusted domain, that the generated one or more RAN insights are to be exposed in.

The indication may be explicit or implicit and may indicate the trusted or untrusted domain in several different ways.

In some embodiments, the indication comprises any one out of:
- metadata indicating whether the one or more RAN insights are for a trusted application and are to be exposed in a trusted domain, or are for an untrusted application and are to be exposed in an untrusted domain, and
- RAN insights that are to be exposed in a trusted domain are published in an associated first message bus, and RAN insights that are to be exposed in an untrusted domain are published in an associated second message bus,
- an indication to expose the one or more RAN insights in a trusted network node 130, 132, e.g. a core network node such as e.g. NWDAF, NEF, API-GW,
- an indication to expose the one or more RAN insights in an untrusted network node 130, 132,
- an indication to expose in a trusted domain, the one or more RAN insights in the application related to the wireless device 120,
- an indication to expose in an untrusted domain, the one or more RAN insights in the application related to the wireless device 120,
- an indication to expose in a trusted domain, the one or more RAN insights in an external application,
- an indication to expose in an untrusted domain, the one or more RAN insights in an external application.

The indicated domain out of a trusted domain or an untrusted domain the generated one or more RAN insights shall be exposed in, may be based on whether the application is trusted or untrusted.

In some embodiments, the indication indicates any one or more out of:
- The published one or more RAN insights are to be exposed in a trusted domain when the one or more RAN insights are to be used in a trusted network node 130, 132,
- the published one or more RAN insights are to be exposed in a trusted domain when the application related to the wireless device 120 is trusted, and
- the generated one or more RAN insights are to be exposed in an untrusted domain when the application related to the wireless device 120 is established to be untrusted.

Action 304

The network node 130 then exposes the published one or more RAN insights in the indicated domain. This may mean that the network node 130 exposes the published one or more RAN insights in the indicated domain to a requesting node to be consumed.

As mentioned above, the nodes that the generated one or more RAN insights are to be exposed in may be nodes that will use the one or more RAN insights, they may be referred to as consumers, e.g. consumers of the generated one or more RAN insights. This node may the one requesting the one or more insights. This node may e.g. be any one or more out of: The network node 130, a trusted network node 130, 132, e.g. a core network node such as e.g. NWDAF, NEF, API-GW, the application related to the wireless device 120 via the trusted network node 130, 132, or an external application via the trusted network node 130, 132

The embodiments described above will now be further explained and exemplified. The example embodiments described below may be combined with any suitable embodiment above.

According to embodiments herein, the RAN 102 is extended with the RAN function node 115, e.g. comprising a functionality which gathers RAN data from E-UTRAN and/or NG-RAN nodes such as the RAN node 110, and processes such RAN data in order to generate useful RAN information referred to as RAN insights. The network node 130 may request specific RAN insights from the RAN function node 115. These RAN insights may then be exposed to and directly be used by the network node 130 requesting the RAN insights, as well as could be then exposed to external applications.

RAN Insight

The one or more RAN insights, here referred to as "the RAN insight" is a processed RAN data and may comprise either statistical or predicted information on e.g., RAN status such as congestion, load, etc., achievable performance such as throughput, latency, etc., where such information might have different levels of granularity, e.g., geographical location such as GPS coordinates, cell-level, tracking area level, etc.

A RAN insight may comprise, but not limited to, the following information.
- A RAN insight ID. This identifies the information with a unique ID. The RAN insight ID may be either standardized, e.g., defined by 3GPP and/or O-RAN, and/or vendor specific, and/or operator specific, and/or application specific.
- A RAN insight value. This may be the value of the produced RAN insight, e.g. congestion level, average throughput, and/or average latency. The RAN insight value may be composed by a several values, e.g., an average value, a min/max range of values, a distribution of values, and it may be in different formats, e.g. numerical or text.
- A RAN insight filter. This is a field that may be used to indicate e.g. that the RAN insight may refer only to some particular users or traffic. As an example, a filter field may include a slice-ID, Quality of service Class Identifier (QCI) or Quality of service Flow Identifier (QFI). QFI or a list of slice-IDs and/or QCIs and/or QFIs, indicating that the RAN insight refers to the specified slice-ID, QCI or QFI.
- A Geo-reference. This may be expressed in terms of, e.g., a list of cell IDs to which the RAN insight refers to, or in the form of one or more tracking areas the RAN insight refers to, or in the form of geographical coordinates such as e.g., GPS coordinates delimiting a certain area, the RAN insight refers to.

Time windows. This is a field that may be of particular importance for a RAN insight such as e.g. a RAN insight predictions, i.e., for RAN insights referring to time ahead. In this case, this field indicates to which future time windows the RAN insight refers to. The time window may be in the form of e.g., start/end times, start time plus duration, etc.

A RAN insight accuracy. This is a field that may be used to indicate the accuracy of a statistical or predicted and/or estimated RAN insight.

To separate the consumers, the one or more RAN insights may be associated to different indications such as different metadata, i.e., the RAN function node 115 may publish the one or more RAN Insights using different indications such different metadata.

As an example, the RAN function node 115 publishes one RAN insight which has some information associated to a trusted metadata and other information associated to an untrusted metadata. In this case, a first message bus is in charge of delivering the RAN insight associated to the trusted metadata in a trusted domain to the trusted receivers, also referred to as consumers, and the RAN insight associated to untrusted metadata in an untrusted domain to untrusted receivers.

In another implementation, the RAN function node 115 may publish two different RAN insights, one associated with a trusted metadata and another associated with a "untrusted" metadata, so that trusted and/or untrusted receivers receive the right RAN insight in the respective trusted and/or untrusted domain. In this way, consumers of RAN insights may be separated, i.e., untrusted third party applications are aware used in a certain set of metadata in an untrusted domain, while a Mobile Network Operators (MNO) MNO internal and/or trusted application use a private set of metadata for the trusted domain. In addition to the separation of trusted and untrusted domains, the data may be further protected by using encryption, for example for the private MNO data using the vendor certificates, that may be included in the entities, to encrypt the "RAN Insights".

Figure 4:
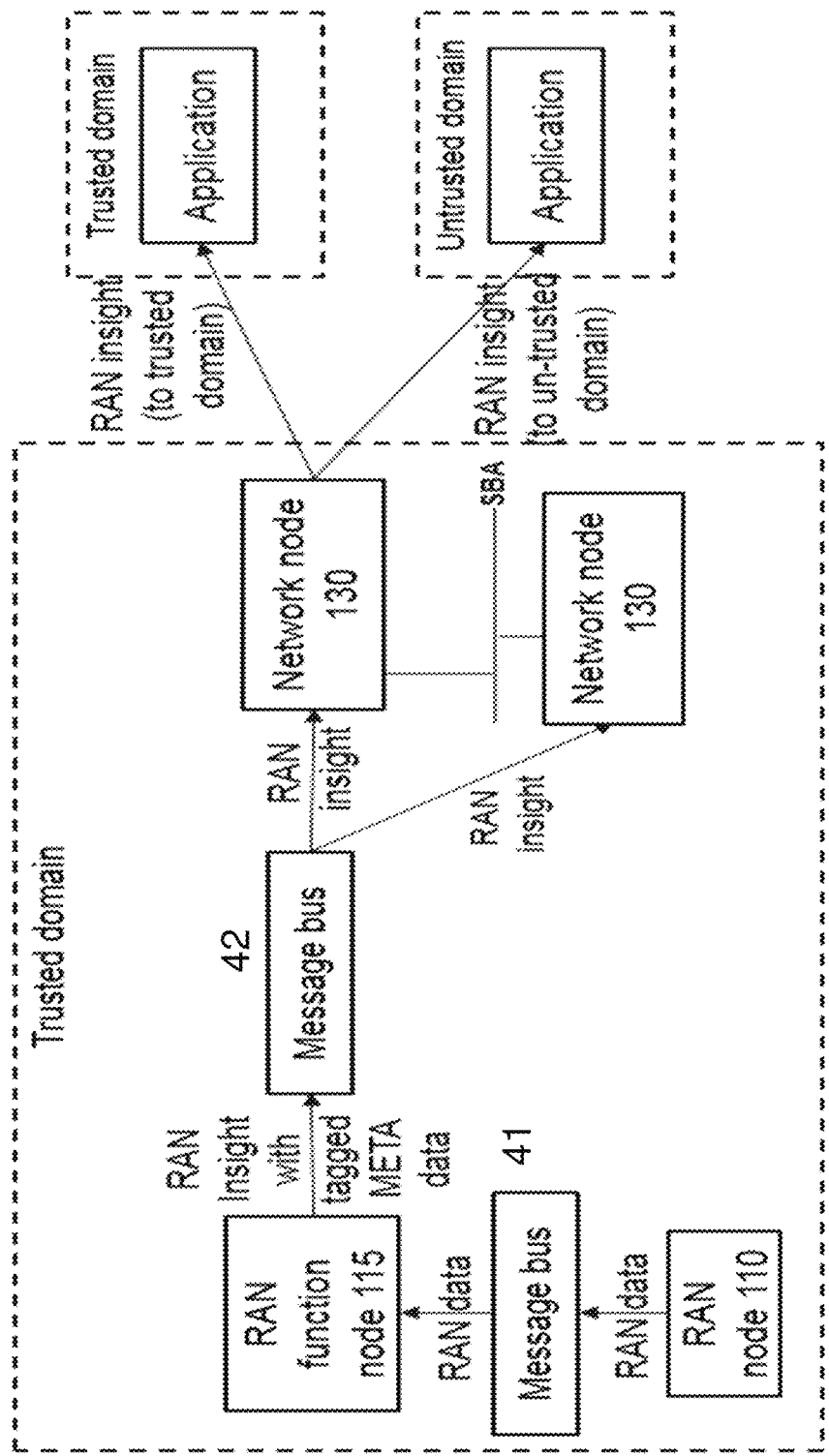
FIG. 4 is a schematic block diagram illustrating embodiments herein.

Some first example embodiments are shown in FIG. 4. In the first example embodiments of the RAN function node 115 functionality a message bus is used to expose RAN insights, e.g. to other nodes such as node functions of a 5G core, e.g., NWDAF, or to external applications, in this example, e.g. through the network node 130 such as e.g. an API-GW.

In FIG. 4 the RAN function node 115 indicates which domain the one or more RAN shall be exposed in by tagging in metadata if a RAN Insight is for a trusted application to be exposed in a trusted domain or for an untrusted application to be exposed in an untrusted domain. The network node distributes the one or more RAN insights accordingly.

In FIG. 4, the RAN function node 115 generates RAN insights upon request from other network entities such as the network node 130 by using RAN data. The RAN node 110 e.g. using E-UTRAN and/or NG-RAN, streams RAN data, this is published to a message bus 41 system, e.g. based on Kafka, including metadata that identifies the RAN data. The RAN function node 115 analyses and processes such RAN data and then produces one or more RAN Insights that are published on the message bus 42, with meta data that identifies the RAN Insights. It may either be in the same message bus used for publishing RAN data or a different one, depending on implementation. Trough the message bus 42, the one or more RAN insights may be exposed to the trusted domain for MNO applications or trusted third party applications residing and subscribing to the RAN Insights as well as delivered to 3rd party applications which reside on an un-trusted domain.

Figure 5:
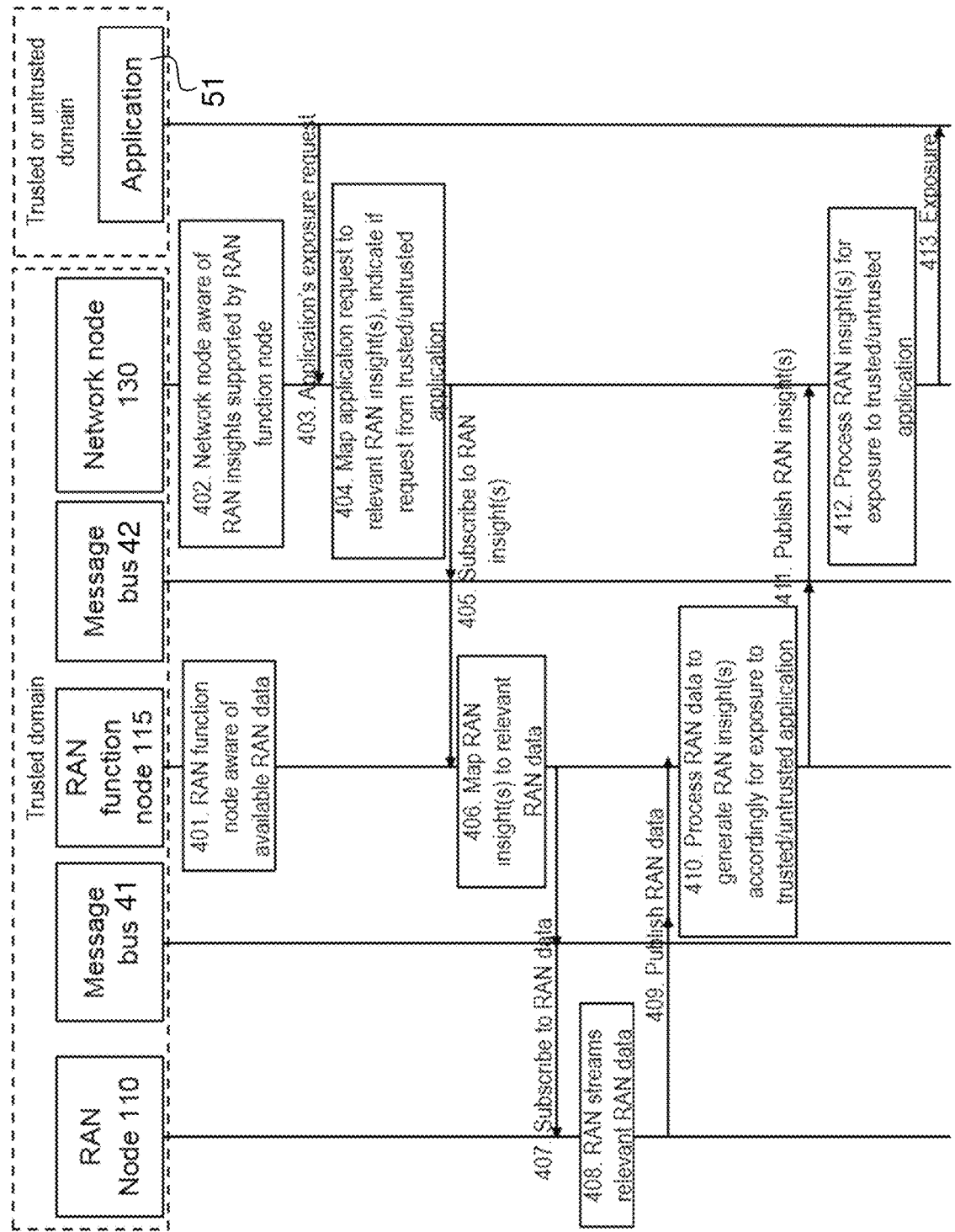
FIG. 5 is a combined flowchart and signalling scheme illustrating embodiments herein.

FIG. 5 is a sequence diagram depicting an embodiment of the method in an example scenario relating to FIG. 4, which is a case using the single message bus 42 in a trusted domain to expose the one or more RAN insights to both trusted and untrusted applications in respective trusted and untrusted domains.

In FIG. 5 the network node 130 subscribe to one or RAN insights generated by the RAN function node 115 considers the case of exposure to external application through the network node 130 and using the message bus 42 for RAN insights subscription and/or publish. In the diagram flow, it is considered that the message bus 42 used for subscription and/or publishing of data handles the process of subscription and publishing of data. The high-level diagram flow may be described as follows:

Action 401. The RAN function node 115 is aware of available RAN data. In the diagram flow, the relevant nodes are aware of which data they can subscribe to. i.e., the RAN function node 115 is aware of which data it can subscribe to from the RAN node 110.

Action 402. The network node 130 is aware of one or more RAN insights supported by the RAN function node 115.

In the diagram flow, the relevant nodes are aware of which data they can subscribe to. i.e., also, the network entity is aware of which RAN insights it can subscribe to from the RAN function node 115.

Action 403. An application 51 in a node sends an exposure request, to the network node 130. The exposure request may e.g. be a service defined by 3GPP, e.g., subscription to QoS Sustainability Analytics offered by NWDAF through NEF, or a network-specific service. The exposure request may comprise information of required exposure information, application-specific information such as UE IDs, 5QIs, QFIs, geographical area of relevance, time windows of relevance, etc.

Action 404. The network node 130 maps the exposure request from the application 51 to relevant one or more RAN insight(s), an it may indicate if the exposure request is from trusted or an untrusted application.

The network node 130 in charge of handling the application's exposure request, processes the exposure request. The processes may include:

Checking exposure authorization, i.e., checking with other network nodes, e.g., a Policy Control Function (PCF) node, whether the application is authorized to request the service.

Mapping the exposure request to relevant one or more RAN insights, also referred to as select the one or more RAN insights based on the exposure request. I.e., if the application 51 is interested in throughput prediction then the network node 130 maps the request to e.g. an average cell throughput prediction RAN insight.

Action 405. The network node 130 then subscribes to selected RAN insight(s) through the message bus, e.g. the message bus 42. This may be performed by sending the first subscription request to the RAN function node 115. In this subscription process, the network node 130 may indicate:

which metadata that would be required for the RAN insights, e.g., whether the RAN insights should be generated with trusted and/or untrusted metadata. This may be mapped depending on whether the application 51 requesting the RAN insight is trusted or not.

IDs of UEs such as the wireless device 120 involved in the application 51, or other ways to identify the traffic of relevant for RAN insight generation, e.g., 5G QoS Identifier (5QI) and/or QoS Flow ID (QFI).

Geographical areas of relevance and/or time windows to generate the one or more RAN insights.

Periodicity, indicating whether it is interested to a single-one one or more RAN insights, or to a periodic RAN insight, etc.

Action 406. The RAN function node 115 maps the one or more RAN insight(s) to relevant RAN data. This means that the RAN function node 115 identifies RAN data needed to fulfil the first subscription request for the one or more RAN insights.

This may be performed by processing the first subscription request. The process may comprise checking which RAN data would be necessary to generate the required one or more RAN insight(s).

Action 407. The RAN function node 115 subscribes to identified RAN data. This is performed by sending a second subscription request for the identified RAN data to the RAN node 110 via the message bus 41.

Action 408. The RAN node 110 streams the RAN data according to the second subscription request.

Action 409. When RAN data according to the second subscription request is available, the RAN node 110 publishes RAN data which then reach RAN PF through the message bus, e.g. the message bus 41, to be reached by the RAN function node 115.

Action 410. The RAN function node 115 processes the RAN data to generate the one or more RAN insight(s) accordingly for exposure to a trusted and/or untrusted application. The RAN function node 115 finds out, also referred to as establishes, which domain out of a trusted domain or an untrusted domain the generated one or more RAN insights are to be exposed in.

The RAN function node 115 may e.g. consider the metadata, comprised in the first subscription request from the network node 130 where the network node 130 may have indicated whether the RAN insights should be generated with trusted and/or untrusted metadata to be exposed in respective trusted domain or untrusted domain. The RAN function node 115 may process specific information included in the first subscription request from the network 130. E.g. the RAN function node 115 may check the information associated to the final receiver, such as e.g., name, ID, and/or address, and obtain from this whether the final receiver is trusted or untrusted. As an alternative, e.g. the network node 130 may e.g. include specific tags in the first subscription request whether the final receiver of RAN insights is a trusted or untrusted receiver. The network node 130 may e.g. be aware that, for a certain metric e.g. throughput prediction, the RAN function node 115 supports two RAN insights, e.g. "throughput prediction for trusted receiver" and "throughput prediction for untrusted receiver," and the network node 130 may subscribe to the proper RAN insight depending on the final receiver being trusted or untrusted.

Action 411. The RAN function node 115 then publishes the generated one or more RAN insights through the single message bus 42. The published one or more RAN insights then reaches the relevant network entities such as in this scenario the network node 130. This is since the generated one or more RAN insights are published in the single message bus 42 In some embodiments the message bus 42 may handles this. When the network node 130 subscribes to a RAN insight, it may be up to the message bus 42 to dispatch the RAN insight to the network node 130 once it has been published by the RAN function node 115

The published one or more RAN insights indicates to the network node 130, whether to expose the generated one or more RAN insights in the trusted domain or in the untrusted domain.

Action 412. When one or more RAN insights according to the first subscription is generated and published by the RAN function node 115, network node 130 discovers the one or more RAN insights, e.g. by receiving it from the message bus 42, since it is the message bus 42 that in this example handles the delivery of a published content to the right receiver. The published one or more RAN insights comprises the indication that indicates which domain out of a trusted domain or an untrusted domain, that the generated one or more RAN insights are to be exposed in.

The network node 130 thus receives the one or more RAN insight associated to the metadata it subscribed to. The one or more RAN insights are finally processed for exposure to trusted or untrusted application, and eventually translated, for the final exposure to the application. The Translation may include operations e.g. change of addresses, identities, further processing e.g. removal of some information or aggregation of more information.

Action 413. The network node 130 then exposes the one or more RAN insights accordingly to be reached by the application 51 in a trusted or untrusted.

Figure 6:
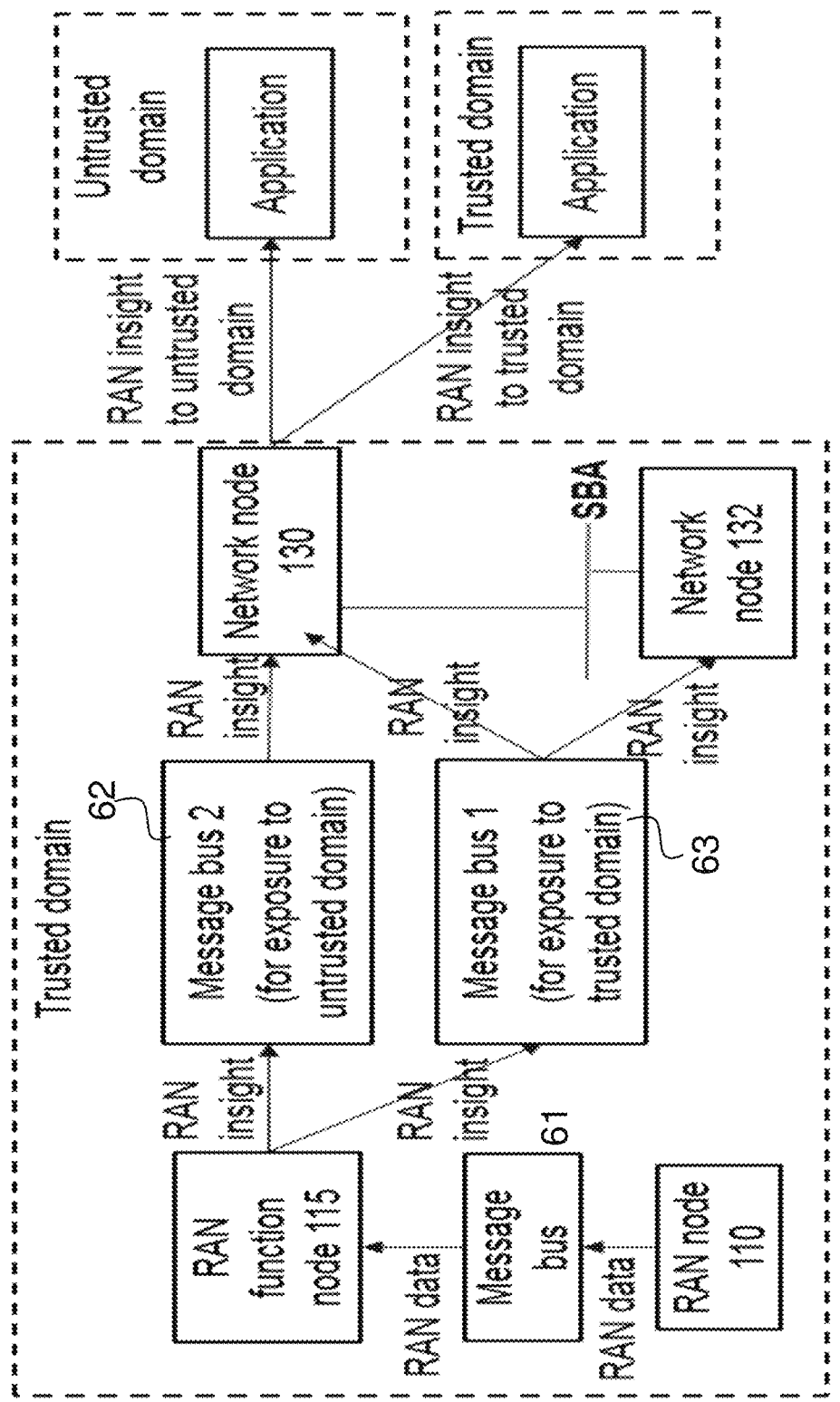
FIG. 6 is a schematic block diagram illustrating embodiments herein.

Some second example embodiments are shown in FIG. 6. In these second example embodiments, the the RAN function node 115 publishes the one or more RAN insights on different message buses, also referred to as message bus instances, depending on indication for trusted or untrusted application. In this example the network node 130 is trusted. However since an network node 130 may be from another vendor, there may also be more separation in case of different levels of "trust" in receivers, e.g. a third message bus instance may be used to deliver the one or more RAN insights to the ultimately trusted RAN O&M system which may be delivered from the RAN vendor.

In the second example embodiments of the RAN function node 115 functionality different message buss are used to expose the one or more RAN insights, e.g. to other nodes such as node functions of a 5G core, e.g., NWDAF, or to external applications, in this example, e.g. through the network node 130 such as e.g. an API-GW.

In FIG. 6, the RAN function node 115 generates RAN insights upon request from other network entities such as the network node 130 by using RAN data. The RAN node 110 e.g. using E-UTRAN and/or NG-RAN, streams RAN data, this is published to a message bus 61 system, e.g. based on Kafka, including metadata that identifies the RAN data. The RAN function node 115 analyses and processes such RAN data and then produces one or more RAN Insights. The generated one or more RAN Insights are published on a first message bus 62 for exposure to untrusted domains and on a second message bus 63 for exposure to trusted domains.

Figure 7:
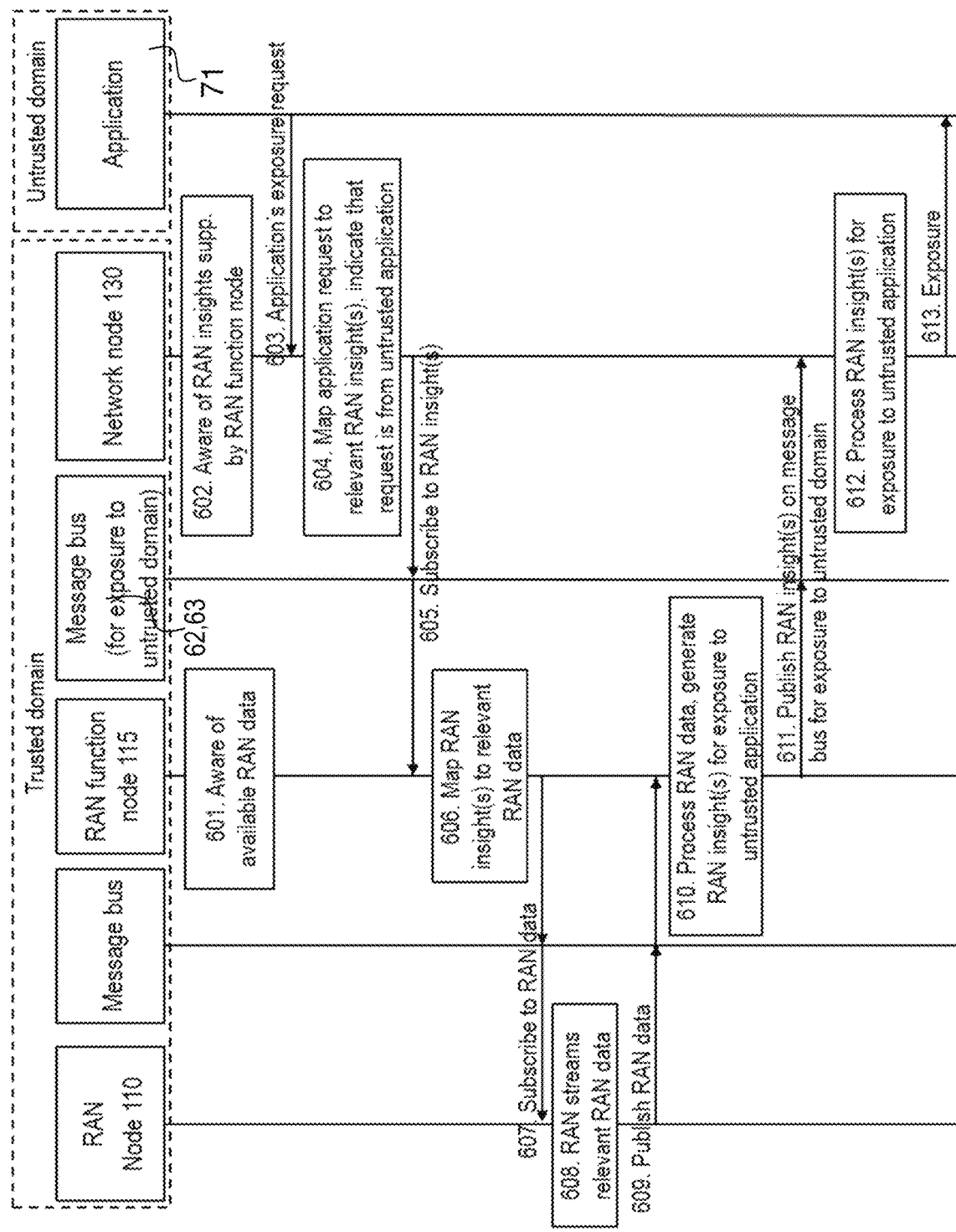
FIG. 7 is a combined flowchart and signalling scheme illustrating embodiments herein.

FIG. 7 is a sequence diagram depicting an embodiment of the method in an example scenario relating to FIG. 6, which is a case using different message buses to expose the one or more RAN insights to trusted and untrusted applications in respective trusted and untrusted domains.

In FIG. 7 the network node 130 subscribe to one or RAN insights generated by the RAN function node 115 considers the case of exposure to external application through the network node 130 and uses a first message bus 62 for RAN insights subscription and/or publish for an untrusted application 71 according to the example, in an untrusted domain and a second message bus 63 for RAN insights subscription and/or publish for a trusted application in a trusted domain. The high-level diagram flow may be described as follows: A high-level diagram means that the diagram may not include all the details and information required e.g. to implement the procedure e.g. a subscription step shown in the high-level diagram flow may show only a subscription request while a detailed diagram flow may include also a response indicating whether the subscription was successful or not.

This means that in the second example embodiments, provide a way of separating the RAN insights for the trusted and untrusted domains by using two or more different message bus instances. The the RAN function node 115 publishes the one or more RAN insights on the relevant message bus depending on which domains the respective one or more RAN insights should be delivered to. In this example the network node is trusted.

In these second example embodiments the Actions 601-610 corresponds to respective Actions 401-410 as described above.

Action 611. The RAN function node 115 then publishes the generated one or more RAN insights. The generated one or more RAN insights to be exposed in an untrusted domain are published through the first message bus 62 and the generated one or more RAN insights to be exposed in a trusted domain are published through the second message bus 63. The published one or more RAN insights then reaches the relevant network entities such as in this scenario the network node 130. When reached through the first message bus 62, this indicates to the network node 130 that the one or more RAN insights are to be exposed in an untrusted domain and when reached through the second message bus 63, this indicates to the network node 130 that the one or more RAN insights are to be exposed in a trusted domain.

In this way, the published one or more RAN insights indicates to the network node 130, whether to expose the generated one or more RAN insights in the trusted domain or in the untrusted domain.

Action 612. When one or more RAN insights according to the first subscription is generated and published by the RAN function node 115, network node 130 discovers the one or more RAN insights. The published one or more RAN insights comprises the indication that indicates which domain out of a trusted domain or an untrusted domain, that the generated one or more RAN insights are to be exposed in as explained above.

Thus, when reached through the first message bus 62, this indicates to the network node 130 that the one or more RAN insights are to be exposed in an untrusted domain and when reached through the second message bus 63, this indicates to the network node 130 that the one or more RAN insights are to be exposed in a trusted domain.

The network node 130 thus receives the one or more RAN insight associated to the metadata it subscribed to. The one or more RAN insights are finally processed for exposure to trusted or untrusted application accordingly, and eventually translated, for the final exposure to the application.

Action 613. The network node 130 then exposes the one or more RAN insights accordingly to be reached by the application 51 in a trusted or untrusted domain in Please note that, according to embodiments herein, the RAN may be extended with a RAN insight Application Programming Interfaces (API) provided to offer RAN insights to external applications and/or network functions, i.e., provide RAN insights outside RAN domain. The API may be implemented e.g. in the the RAN function node 115, and e.g. support the procedures for subscription to the one or more RAN insights and publication of the one or more RAN insights.

The RAN insight API may be implemented and offered to consumers outside the RAN 102 domain in several ways: The RAN directly using the RAN insight API to provide RAN insights to consumers, e.g., network functions, external applications, one or more message buses using the RAN insight API for handling subscription/publishing of the one or more RAN insights from other network functions or applications, other network functionalities, such as e.g., API GW, providing support of RAN insight API to external applications.

In some third embodiments, the one or more RAN insights may be exposed to external applications. In these embodiments the network node 130 may subscribe to one or more RAN insights generated by the the RAN function node 115 considering the case of exposure to external application through the network node when e.g. being an API-GW and using a message for the one or more RAN insights subscription and/or publish. In these embodiments, it may be considered that hat message buses used for subscription and/or publishing of data handles the process of subscription and publishing of data, as well as relevant nodes are aware of which data they can subscribe to, i.e. the RAN function node 115 is aware of which data can subscribe to from the RAN node, the network node 130 is aware of which RAN insights it can subscribe to from the the RAN function node 115. In these embodiments an external application sends an exposure request to the network node 130. The exposure request may e.g. be either a service defined by 3GPP, e.g., subscription to QoS Sustainability Analytics offered by NWDAF through NEF, or a network-specific service. The exposure request may include information of required exposure information, application-specific information such as UE IDs, 5QIs, QFIs, geographical area of relevance, time windows of relevance, etc.

Figure 8A:
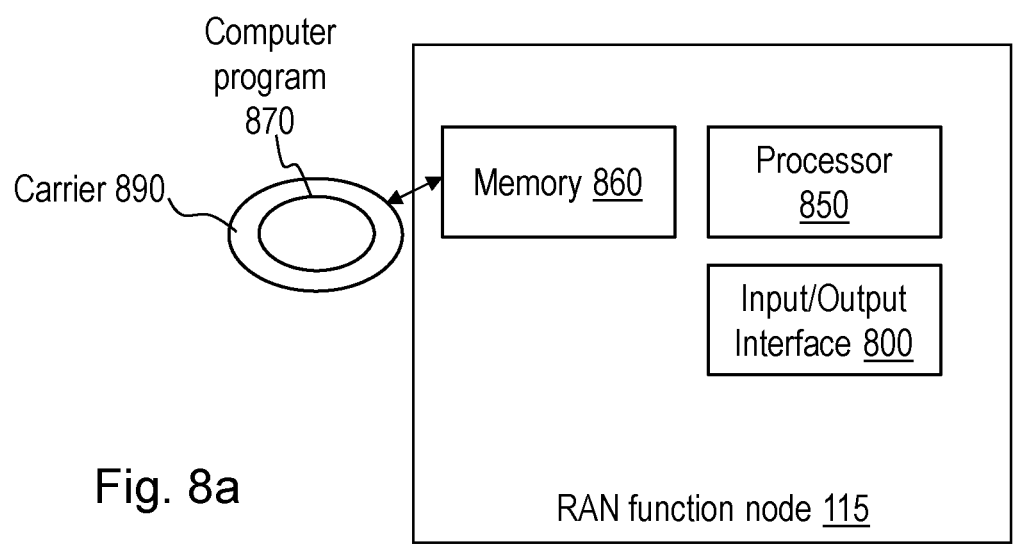
FIGS. 8 a and b are schematic block diagrams depicting embodiments in a RAN function node.
Figure 8B:
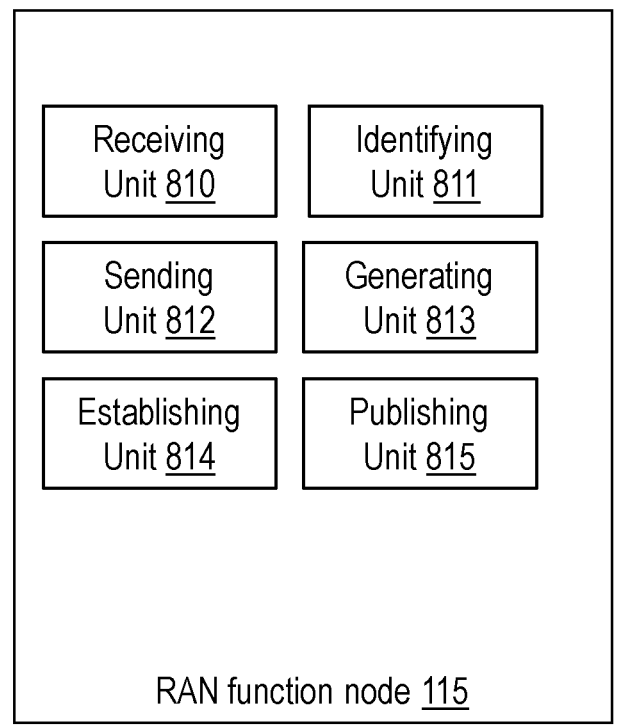

To perform the action as mentioned above, the RAN function node 115 may comprise the arrangement as shown in FIGS. 8 *a* and *b*. The RAN function node 115 is configured to handle connectivity in the RAN 102 of the wireless communications network 100.

The RAN function node 115 may comprise a respective input and output interface 800 configured to communicate with e.g. the network node 130, see FIG. 8*a*. The input and output interface 800 may comprise a wireless receiver (not shown) and a wireless transmitter (not shown).

The RAN function node 115 may further be configured to, e.g. by means of a receiving unit 810 in the RAN function node, receive from the network node 130, a first subscription request for one or more RAN insights relating to the connectivity, requested for an application related to the wireless device 120.

The RAN function node 115 may further be configured to, e.g. by means of the receiving unit 810 in the RAN function node, receive from the RAN node 110, published RAN data according to the second subscription request, when RAN data according to the second subscription request is available.

The RAN function node 115 may further be configured to, e.g. by means of the receiving unit 810 in the RAN function node, receive the first subscription request for one or more RAN insights relating to the connectivity from any one out of:

A trusted network node 130, 132,
the application related to the wireless device 120 via the trusted network node 130, 132, and an external application via the trusted network node 130, 132.

The RAN function node 115 may further be configured to, e.g. by means of an identifying unit 811 in the RAN function node, identify RAN data needed to fulfil the subscription request for the one or more RAN insights.

The RAN function node 115 may further be configured to, e.g. by means of a sending unit 812 in the RAN function node, send to the RAN node 110, a second subscription request for the identified RAN data.

The RAN function node 115 may further be configured to, e.g. by means of a generating unit 813 in the RAN function node, generate the one or more RAN insights according to the first subscription request based on the received RAN data.

The RAN function node 115 may further be configured to, e.g. by means of a establishing unit 814 in the RAN function node, establish which domain out of a trusted domain or an untrusted domain the generated one or more RAN insights are to be exposed in.

The RAN function node 115 may further be configured to, e.g. by means of the establishing unit 814 in the RAN function node, establish which domain out of a trusted domain or an untrusted domain the generated one or more RAN insights shall be exposed in based on whether the application is trusted or untrusted.

The RAN function node 115 may further be configured to, e.g. by means of the establishing unit 814 in the RAN function node, establish which domain out of a trusted domain or an untrusted domain the generated one or more RAN insights shall be exposed in, by establishing that:

The generated one or more RAN insights are to be exposed in a trusted domain when the RAN insights are to be used in a trusted network node 130, 132, the generated one or more RAN insights are to be exposed in a trusted domain when the application related to the wireless device 120 is established to be trusted, and the generated one or more RAN insights are to be exposed in an untrusted domain when the application related to the wireless device 120 is established to be untrusted.

The RAN function node 115 may further be configured to, e.g. by means of a publishing unit 815 in the RAN function node, publish the generated one or more RAN insights according to the first subscription request to reach the network node 130. The publishing is adapted to comprise an indication indicating to the network node 130, the established domain out of a trusted domain or an untrusted domain, that the generated one or more RAN insights are to be exposed in.

In some embodiments, the indication is arranged to comprise any one out of:

Metadata adapted to indicate whether the one or more RAN insights are for a trusted application and are to be exposed in a trusted domain, or are for an untrusted application and are to be exposed in an untrusted domain, and RAN insights that are to be exposed in a trusted domain are published in an associated first message bus, and RAN insights that are to be exposed in an untrusted domain are published in an associated second message bus, an indication to expose the one or more RAN insights in a trusted network node 130, 132, an indication to expose the one or more RAN insights in an untrusted network node 130, 132, an indication to expose in a trusted domain, the one or more RAN insights in the application related to the wireless device 120, an indication to expose in an untrusted domain, the one or more RAN insights in the application related to the wireless device 120, an indication to expose in a trusted domain, the one or more RAN insights in an external application, and an indication to expose in an untrusted domain, the one or more RAN insights in an external application.

In some embodiments, the network node 130 is adapted to be a trusted network node.

In some embodiments, the RAN function node 115, the network node 130, and the RAN node 110 are arranged to operate in the same trusted domain.

The embodiments herein may be implemented through a processor or one or more processors, such as a processor 850 of a processing circuitry in the RAN function node 115 in FIG. 8*a*, together with computer program code for performing the functions and actions of the embodiments herein. The program code mentioned above may also be provided as a computer program product, for instance in the form of a data carrier carrying computer program code for performing the embodiments herein when being loaded into the RAN function node 115. One such carrier may be in the form of a CD ROM disc. It is however feasible with other data carriers such as a memory stick. The computer program code may furthermore be provided as pure program code on a server and downloaded to the RAN function node 115.

The RAN function node 115 may further comprise a memory 860 comprising one or more memory units. The memory 860 comprises instructions executable by the processor 850 in the RAN function node 115. The memory 860 is arranged to be used to store, e.g. indications, information, data, configurations, and applications, to perform the methods herein when being executed in the RAN function node 115.

In some embodiments, a computer program 870 comprises instructions, which when executed by the at least one processor 850, cause the at least one processor 850 of the RAN function node 115 to perform the actions above.

In some embodiments, a carrier 890 comprises the computer program 870, wherein the carrier 890 is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the RAN function node 115, that when executed by the one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 9A:
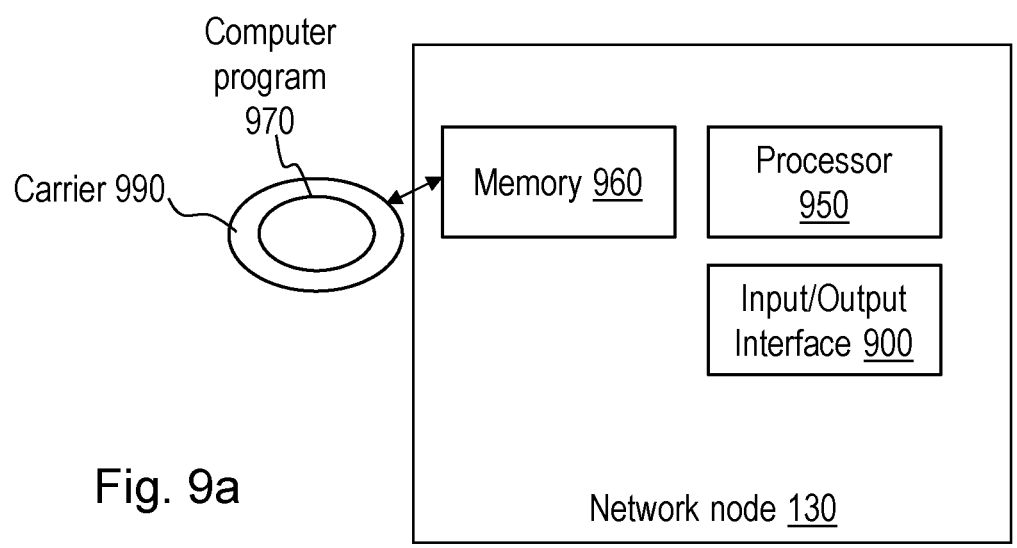
FIGS. 9 a and b are schematic block diagrams depicting embodiments in a network node.
Figure 9B:
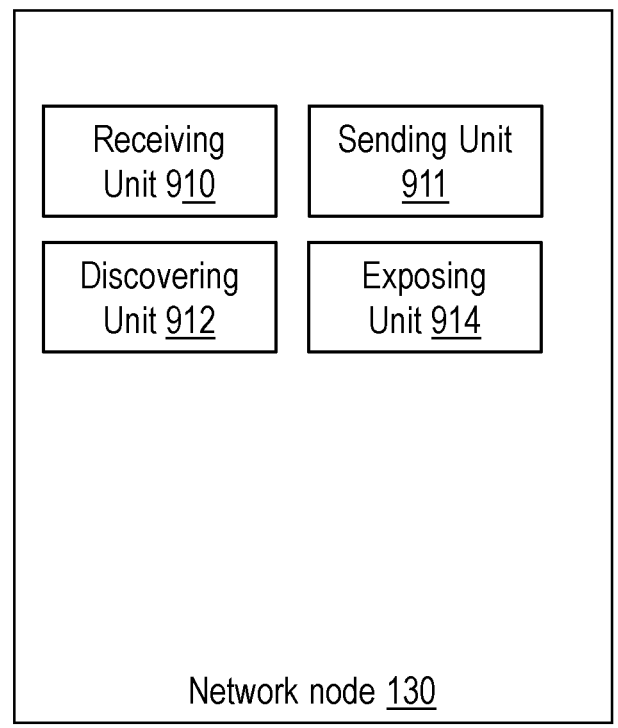

To perform the action as mentioned above, the network node 130 may comprise the arrangement as shown in FIGS. 9 *a* and *b*. The network node 130 is configured to handle connectivity in the RAN 102 of the wireless communications network 100.

The network node 130 may comprise a respective input and output interface 500 configured to communicate with e.g. the RAN function node 115, see FIG. 9*a*. The input and output interface 500 may comprise a wireless receiver (not shown) and a wireless transmitter (not shown).

The network node 130 may further be configured to, e.g. by means of an receiving unit 911 in the network node 130, receive the first subscription request for one or more RAN insights relating to the connectivity from any one out of:

A trusted network node 132, the application related to the wireless device 120, and an external application.

The network node 130 may further be configured to, e.g. by means of an sending unit 912 in the network node 130, send to the RAN function node 115 a first subscription request for one or more RAN insights relating to the connectivity, requested for an application related to a wireless device 120.

The network node 130 may further be configured to, e.g. by means of an discovering unit 913 in the network node 130, discover the one or more RAN insights when one or more RAN insights according to the first subscription is generated and published by the RAN function node 115. The published one or more RAN insights are arranged to comprise an indication adapted to indicate a domain out of a trusted domain or an untrusted domain, that the generated one or more RAN insights are to be exposed in.

In some embodiments, the indication is arranged to comprise any one out of:

Metadata indicating whether the one or more RAN insights are for a trusted application and are to be exposed in a trusted domain, or are for an untrusted application and are to be exposed in an untrusted domain, and RAN insights that are to be exposed in a trusted domain are published in an associated first message bus, and RAN insights that are to be exposed in an untrusted domain are published in an associated second message bus, an indication to expose the one or more RAN insights in a trusted network node 130, 132, an indication to expose the one or more RAN insights in an untrusted network node 130, 132, an indication to expose in a trusted domain, the one or more RAN insights in the application related to the wireless device 120, an indication to expose in an untrusted domain, the one or more RAN insights in the application related to the wireless device 120, an indication to expose in a trusted domain, the one or more RAN insights in an external application, and an indication to expose in an untrusted domain, the one or more RAN insights in an external application.

In some embodiments, the indicated domain out of a trusted domain or an untrusted domain the generated one or more RAN insights shall be exposed in, is arranged to be based on whether the application is trusted or untrusted.

In some embodiments, the indication is adapted to indicate any one or more out of:

the published one or more RAN insights are to be exposed in a trusted domain when the one or more RAN insights are to be used in a trusted network node 130, 132, the published one or more RAN insights are to be exposed in a trusted domain when the application related to the wireless device 120 is trusted, and the generated one or more RAN insights are to be exposed in an untrusted domain when the application related to the wireless device 120 is established to be untrusted.

The network node 130 may further be configured to, e.g. by means of an exposing unit 914 in the network node 130, expose the published one or more RAN insights in the indicated domain.

In some embodiments, the RAN function node 115, the network node 130 are arranged to operate in the same trusted domain.

The embodiments herein may be implemented through a processor or one or more processors, such as a processor 950 of a processing circuitry in the network node 130 in FIG. 9a, together with computer program code for performing the functions and actions of the embodiments herein. The program code mentioned above may also be provided as a computer program product, for instance in the form of a data carrier carrying computer program code for performing the embodiments herein when being loaded into the network node 130. One such carrier may be in the form of a CD ROM disc. It is however feasible with other data carriers such as a memory stick. The computer program code may furthermore be provided as pure program code on a server and downloaded to the network node 130.

The network node 130 may further comprise a memory 960 comprising one or more memory units. The memory 960 comprises instructions executable by the processor 950 in the network node 130. The memory 960 is arranged to be used to store, e.g. indications, information, data, configurations, and applications, to perform the methods herein when being executed in the network node 130.

In some embodiments, a computer program 970 comprises instructions, which when executed by the at least one processor 950, cause the at least one processor 950 of the network node 130 to perform the actions above.

In some embodiments, a carrier 990 comprises the computer program 970, wherein the carrier 980 is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 130 that when executed by the one or more processors such as the processors or processor circuitry described above. One or more of these processors, as well as the other digital hardware, may be included in a single ASIC, or several processors and various digital hardware may be distributed among several separate components, whether individually packaged or assembled into an SoC.

FURTHER EXTENSIONS AND VARIATIONS

Figure 10:
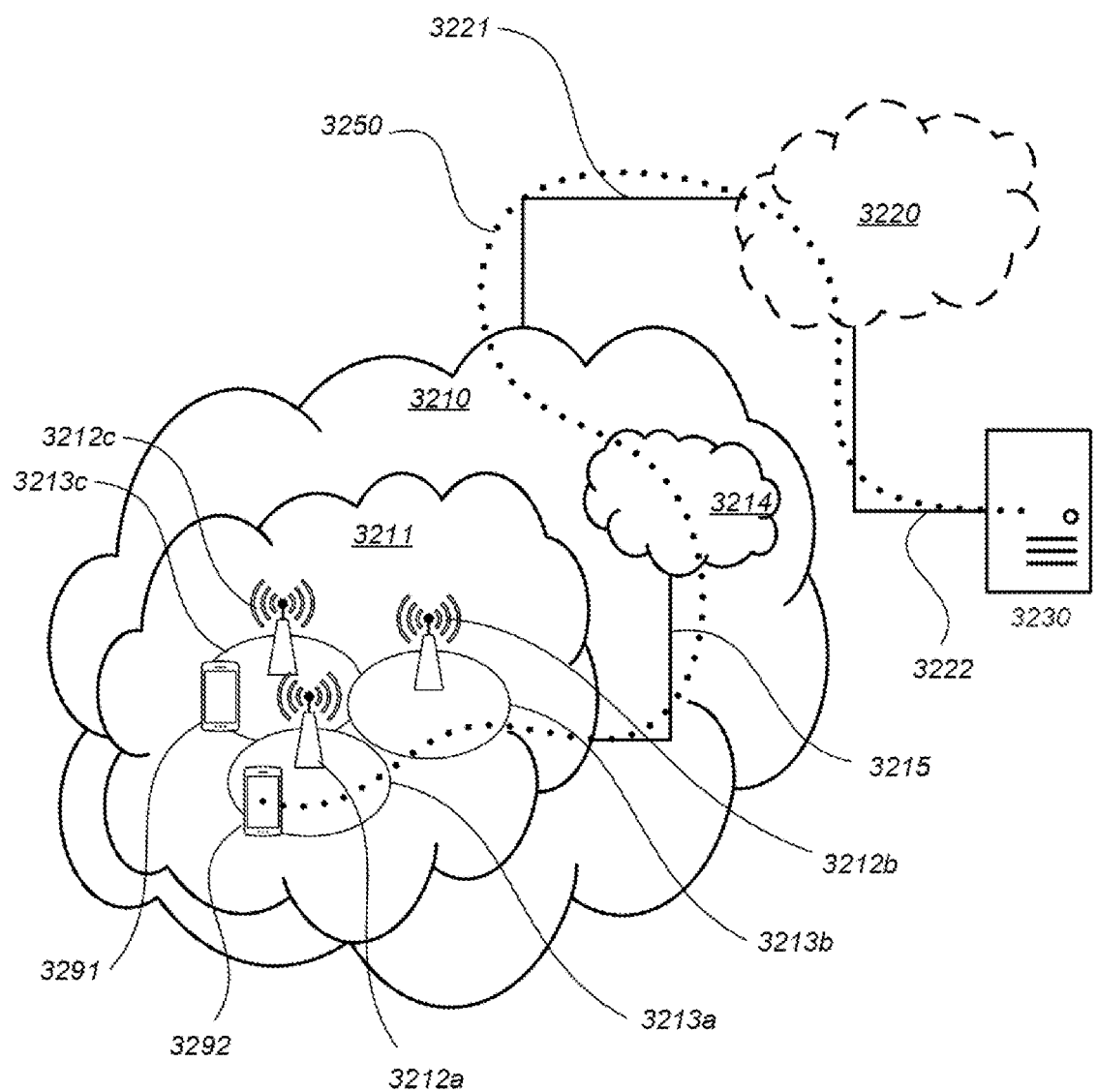
FIG. 10 schematically illustrates a telecommunication network connected via an intermediate network to a host computer.

With reference to FIG. 10, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, e.g. RAN 102, and a core network 3214. The access network 3211 comprises a plurality of base stations 3212a, 3212b, 3212c, such as the network node 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first UE e.g. the UE 120 such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, e.g. cloud 140, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
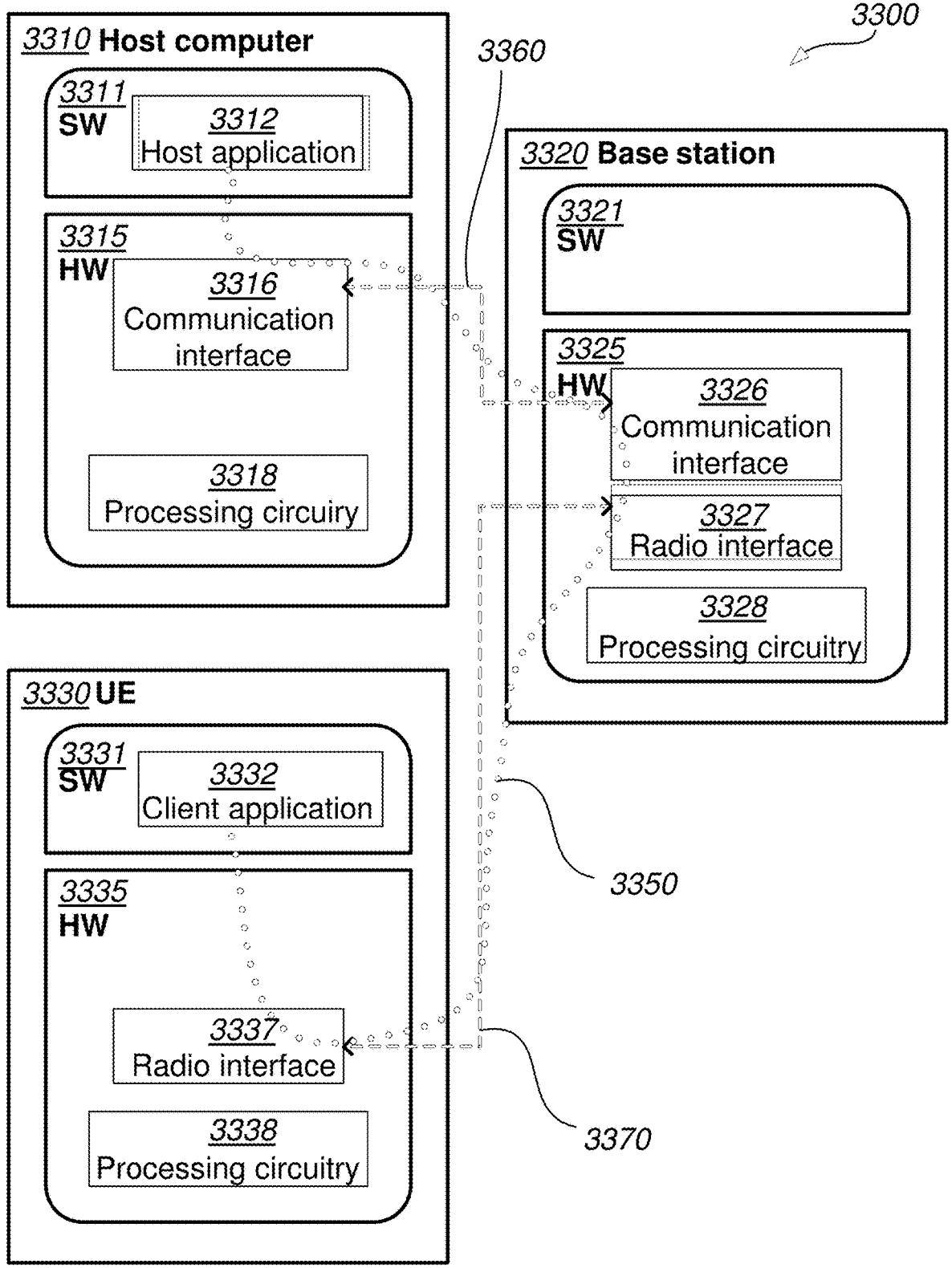
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 7, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station such as the central node 130, and a UE such as the UE 120, which may be those described with reference to FIG. 10 and FIG. 11. For simplicity of the present disclosure, only drawing references to FIG. 12 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 13 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 14 will be included in this section. In an optional first action 3610 of the method, the UE receives input data provided by the host computer. Additionally, or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 15 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a Radio Access Network, RAN, function node, for handling connectivity in a RAN of a wireless communications network, the method comprising:
    receiving from a network node, a first subscription request for one or more RAN insights relating to the connectivity, requested for an application related to a wireless device, identifying RAN data needed to fulfil the subscription request for the one or more RAN insights, sending to a RAN node, a second subscription request for the identified RAN data, when RAN data according to the second subscription request is available, receiving from the RAN node, published RAN data according to the second subscription request, generating the one or more RAN insights according to the first subscription request based on the received RAN data, and establishing which domain out of a trusted domain or an untrusted domain the generated one or more RAN insights are to be exposed in, and publishing the generated one or more RAN insights according to the first subscription request to reach the network node, wherein the publishing comprises an indication, indicating to the network node the established domain out of a trusted domain or an untrusted domain, that the generated one or more RAN insights are to be exposed in.

2. The method according to claim 1, wherein the indication comprises any one out of:

metadata indicating whether the one or more RAN insights are for a trusted application and are to be exposed in a trusted domain, or are for an untrusted application and are to be exposed in an untrusted domain, and RAN insights that are to be exposed in a trusted domain are published in an associated first message bus, and RAN insights that are to be exposed in an untrusted domain are published in an associated second message bus, an indication to expose the one or more RAN insights in a trusted network node, an indication to expose the one or more RAN insights in an untrusted network node, an indication to expose in a trusted domain, the one or more RAN insights in the application related to the wireless device, an indication to expose in an untrusted domain, the one or more RAN insights in the application related to the wireless device, an indication to expose in a trusted domain, the one or more RAN insights in an external application, an indication to expose in an untrusted domain, the one or more RAN insights in an external application.

3. The method according to claim 1, wherein the establishing which domain out of a trusted domain or an untrusted domain the generated one or more RAN insights shall be exposed in, is based on whether the application is trusted or untrusted.

4. The method according to claim 1, wherein the establishing which domain out of a trusted domain or an untrusted domain the generated one or more RAN insights shall be exposed in, comprises establishing that any one out of:

the generated one or more RAN insights are to be exposed in a trusted domain when the RAN insights are to be used in a trusted network node, the generated one or more RAN insights are to be exposed in a trusted domain when the application related to the wireless device is established to be trusted, and the generated one or more RAN insights are to be exposed in an untrusted domain when the application related to the wireless device is established to be untrusted.

5. The method according to claim 1, wherein the network node is a trusted network node.

6. The method according to claim 1, wherein the first subscription request for one or more RAN insights relating to the connectivity is received from any one out of:

a trusted network node, the application related to the wireless device via the trusted network node, an external application via the trusted network node.

7. The method according to claim 1, wherein the RAN function node, the network node, and the RAN node are operating in the same trusted domain.

8. A method performed by a network node, for handling connectivity in a Radio Access Network, RAN, of a wireless communications network, the method comprising:

sending to a RAN function node a first subscription request for one or more RAN insights relating to the connectivity, requested for an application related to a wireless device, when one or more RAN insights according to the first subscription is generated and published by the RAN function node, discovering the one or more RAN insights, wherein the published one or more RAN insights comprises an indication, indicating a domain out of a trusted domain or an untrusted domain, that the generated one or more RAN insights are to be exposed in, and exposing the published one or more RAN insights in the indicated domain.

9. The method according to claim 8, wherein the indication comprises any one out of:

metadata indicating whether the one or more RAN insights are for a trusted application and are to be exposed in a trusted domain, or are for an untrusted application and are to be exposed in an untrusted domain, and RAN insights that are to be exposed in a trusted domain are published in an associated first message bus, and RAN insights that are to be exposed in an untrusted domain are published in an associated second message bus, an indication to expose the one or more RAN insights in a trusted network node, an indication to expose the one or more RAN insights in an untrusted network node, an indication to expose in a trusted domain, the one or more RAN insights in the application related to the wireless device, an indication to expose in an untrusted domain, the one or more RAN insights in the application related to the wireless device, an indication to expose in a trusted domain, the one or more RAN insights in an external application, an indication to expose in an untrusted domain, the one or more RAN insights in an external application.

10. The method according to claim 8, wherein the indicated domain out of a trusted domain or an untrusted domain the generated one or more RAN insights shall be exposed in, is based on whether the application is trusted or untrusted.

11. The method according to claim 8, wherein the indication indicates any one or more out of:

the published one or more RAN insights are to be exposed in a trusted domain when the one or more RAN insights are to be used in a trusted network node, the published one or more RAN insights are to be exposed in a trusted domain when the application related to the wireless device is trusted, and the generated one or more RAN insights are to be exposed in an untrusted domain when the application related to the wireless device is established to be untrusted.

12. The method according to claim 8, further comprising:
receiving the first subscription request for one or more RAN insights relating to the connectivity from any one out of:
   a trusted network node,
   the application related to the wireless device,
   an external application.

13. The method according to claim 8, wherein the RAN function node, the network node are operating in the same trusted domain.

14. A Radio Access Network, RAN, function node configured to handle connectivity in a RAN of a wireless communications network, wherein the RAN function node is further configured to:
   receive from a network node, a first subscription request for one or more RAN insights relating to the connectivity, requested for an application related to a wireless device,
   identify RAN data needed to fulfil the subscription request for the one or more RAN insights,
   send to a RAN node, a second subscription request for the identified RAN data,
   when RAN data according to the second subscription request is available, receive from the RAN node, published RAN data according to the second subscription request,
   generate the one or more RAN insights according to the first subscription request based on the received RAN data,
   establish which domain out of a trusted domain or an untrusted domain the generated one or more RAN insights are to be exposed in, and
   publish the generated one or more RAN insights according to the first subscription request to reach the network node, wherein the publishing is adapted to comprise an indication indicating to the network node, the established domain out of a trusted domain or an untrusted domain, that the generated one or more RAN insights are to be exposed in.

15. A network node, configured to handle connectivity in a Radio Access Network, RAN, of a wireless communications network, the network node further being configured to:
   send to a RAN function node a first subscription request for one or more RAN insights relating to the connectivity, requested for an application related to a wireless device,
   when one or more RAN insights according to the first subscription is generated and published by the RAN function node, discover the one or more RAN insights, wherein the published one or more RAN insights are arranged to comprise an indication adapted to indicate a domain out of a trusted domain or an untrusted domain, that the generated one or more RAN insights are to be exposed in, and
   expose the published one or more RAN insights in the indicated domain.

\* \* \* \* \*